United States Patent
Yamanaka et al.

[11] Patent Number: 5,986,729
[45] Date of Patent: Nov. 16, 1999

[54] LIQUID CRYSTAL DISPLAY DEVICE AND METHOD OF MANUFACTURING THE SAME

[75] Inventors: Yasuhiko Yamanaka, Hirakata; Naohide Wakita, Suita, both of Japan

[73] Assignee: Matsushita Electric Industrial Co., Ltd., Japan

[21] Appl. No.: 08/889,504

[22] Filed: Jul. 8, 1997

[30] Foreign Application Priority Data

| Jul. 10, 1996 | [JP] | Japan | 8-180326 |
| Nov. 26, 1996 | [JP] | Japan | 8-314543 |
| Mar. 31, 1997 | [JP] | Japan | 9-079393 |
| May 16, 1997 | [JP] | Japan | 9-127057 |

[51] Int. Cl.⁶ ............................................. G02F 1/1347
[52] U.S. Cl. ........................... 349/79; 349/153; 349/158; 349/84; 349/73
[58] Field of Search .................... 349/153, 158, 349/84, 73, 79

[56] References Cited

U.S. PATENT DOCUMENTS

| 4,241,339 | 12/1980 | Ushiyama | 340/702 |
| 5,625,474 | 4/1997 | Aomori et al. | 349/79 |
| 5,712,695 | 1/1998 | Tanaka et al. | 349/79 |
| 5,724,109 | 3/1998 | Nakamura et al. | 349/79 |

FOREIGN PATENT DOCUMENTS

| 5-080302 | 4/1993 | Japan . |
| 6-337643 | 12/1994 | Japan . |
| 5-21590 | 3/1995 | Japan . |
| 7-181454 | 7/1995 | Japan . |
| 8-146456 | 6/1996 | Japan . |

*Primary Examiner*—Robert H. Kim
*Assistant Examiner*—Andrew H. Lee
*Attorney, Agent, or Firm*—Parkhurst & Wendel, L.L.P.

[57] ABSTRACT

An object of the present invention is to provide a liquid crystal display device free from color displacement and having improved contrast ratio as well as an improved aperture ratio. The object is attained by the following structure comprising a substrate having a pixel electrode and a driving element, liquid crystal layers stacked on a substrate, a transparent pixel electrode interposed between the stacked liquid crystal layers, and a driving element provided on the substrate. The transparent pixel electrode is electrically connected to the driving element through an opening formed in a specified region of the liquid crystal layer. Each of the liquid crystal layers is composed of microcapsules each containing a liquid crystal and a binder for binding the microcapsules. An insulating layer is provided between the pixel electrode on the substrate and the liquid crystal layer or between the pixel electrode interposed between the liquid crystal layers and the liquid crystal layer. The wall films of the microcapsules, the binder, and the insulating layer are composed of a photosensitive polymer material.

9 Claims, 20 Drawing Sheets

LIQUID CRYSTAL DISPLAY DEVICE AND METHOD OF MANUFACTURING THE SAME

BACKGROUND OF THE INVENTION (1) Field of the Invention

The present invention relates to a liquid crystal display device and a manufacturing method therefor. More particularly, it relates to a liquid crystal display device and a manufacturing method therefor, wherein a plurality of liquid crystal layers are stacked on a substrate to achieve bright, full-color display of an image.

(2) Description of the Related Art

A typical liquid crystal display device is composed of a liquid crystal sealed between two glass substrates joined together with a specified spacing maintained therebetween.

There have been used liquid crystals in various modes in accordance with the orientation of liquid crystal molecules. Among them are: a twisted nematic liquid crystal (hereinafter referred to as TN liquid crystal), which is the most prevalent liquid crystal; a birefringence liquid crystal in homeotropic (perpendicular) alignment or in homogeneous (parallel) alignment; and a guest-host liquid crystal.

A monochrome liquid crystal display device using the TN liquid crystal is typically constituted such that a TN liquid crystal having positive dielectric anisotropy is sealed between a pair of substrates that have undergone parallel orientation treatment and are formed with pixel electrodes and a counter electrode. The pair of glass substrates are disposed between a polarizer and an analyzer placed with their respective planes of polarization orthogonal to each other.

The monochrome liquid crystal display device as mentioned above achieves display based on the following principle. When no voltage is applied between the electrodes, the alignment of the TN liquid crystal is parallel to the glass substrates with a stable twist of 90°. While passing through the TN liquid crystal, light incident through the polarizer has its plane of polarization rotated 90° in accordance with the twisted alignment of the TN liquid crystal, so that it is allowed to pass through the analyzer. When a voltage is applied between the electrodes, on the other hand, the alignment of the TN liquid crystal is perpendicular to the glass substrates. Accordingly, the light incident through the polarizer passes through the TN liquid crystal with its plane of polarization unrotated but cannot pass through the analyzer since it is absorbed therein. The transmission or blocking of the light Is controlled by the presence or absence of the applied voltage between the electrodes, which provides white or black display.

A color liquid crystal display device using the TN liquid crystal is similarly constituted to the monochrome liquid crystal display device, except that a higher-definition liquid crystal panel and a micro color filter having red, green, and blue regions corresponding to each set of three adjacent pixel electrodes are combined to compose the color liquid crystal display device. Such a color liquid crystal display device achieves full-color display by additive color mixing.

However, the color liquid crystal display device using the TN liquid crystal has difficulty in providing sufficiently high brightness. This is because the micro color filter has a low light transmittance and only the component of incident light having a plane of polarization coincident with that of the polarizer is allowed to pass through the polarizer. Accordingly, the overall transmittance obtained is 10% or lower.

The liquid crystal display device using the birefringence liquid crystal also has a similar problem resulting from the polarizer provided therein.

These problems are particularly remarkable when the foregoing constitution is applied to a reflection-type liquid crystal display device utilizing external light source. In that case, brightness is lowered to a point where color is barely recognizable.

To achieve bright color display, a liquid crystal display device using a guest-host liquid crystal having dichroic dyes is disclosed in Japanese Unexamined Patent Publication SHO 61-238024 or HEI 3-238424.

The liquid crystal display device using the guest-host liquid crystal has a plurality of liquid crystal panels stacked in layers, each composed of a liquid crystal containing a dichroic dye of a different color sealed between a pair of glass-substrate. The glass substrates are normally formed with transparent pixel electrodes and a transparent counter electrode, each composed of indium tin oxide. More specifically, the liquid crystal display device is composed of three liquid crystal panels having therein respective liquid crystals containing yellow, magenta, and cyan dyes to selectively absorb blue, green, and red light depending on the voltage applied. If each of the liquid crystal panels absorbs light of the corresponding color, the liquid crystal display device displays black. If some of the liquid crystal panels absorb light of the corresponding colors, the liquid crystal display device achieves color display. If none of the liquid panels absorbs light, the liquid crystal display device displays white. In short, the liquid crystal display achieves full-color display by subtractive color mixing. Since the liquid crystal display device does not comprise a micro color filter nor polarizer absorbing a large amount of light, it can display relatively bright images compared with the color liquid crystal display device using the TN liquid crystal.

However, even the conventional liquid crystal display device using the guest-host liquid crystal cannot display by far brighter images, whether it is of transmission type having a backlight or of reflection type having a reflector plate. This is because, in the liquid crystal display device of transmission type, light emitted from the backlight should pass through the six glass substrates and the six transparent electrodes. In the liquid crystal display device of reflection type, the incident light through the front plate and the reflected light from the reflector plate should pass through the total of twelve glass substrates and the total of twelve transparent electrodes.

On the other hand, the high-definition liquid crystal display device having a pixel pitch much smaller than the thickness (normally on the order of 1 mm) of the glass substrate has a serious drawback of color displacement experienced when viewed obliquely under the great influence of parallax. To reduce the parallax, a plastic substrate, which can be reduced in thickness more easily than the glass substrate, may be used instead of the glass substrate. However, if consideration is given to the handing of the plastic substrate in the manufacturing process including a lamination step, even a film-like plastic substrate needs a minimum thickness of 0.05 mm or more, normally a thickness of about 0.1 to 0.3 mm, so that it is still difficult to eliminate the influence of parallax.

Since the liquid crystal display device of this type is composed basically of a lamination of three liquid crystal panels, it is necessary to repeat three times the step of joining a pair of glass substrates together and injecting a liquid crystal into the space therebetween, which corresponds to approximately triple the process of manufacturing the liquid crystal display device using the TN liquid crystal, resulting in higher manufacturing cost.

To eliminate the color displacement due to parallax and reduce the manufacturing cost, Japanese Unexamined Patent Publication HEI 6-337643 has proposed a liquid crystal display device of so-called polymer dispersed type, which is shown in FIG. 20. The polymer dispersed liquid crystal display device is composed of liquid crystal layers 295 to 297 and transparent pixel electrodes 292 to 294 stacked on a single glass substrate 291 to form a multi-level structure. In the liquid crystal layer 295, 296, or 297, tiny droplets of a liquid crystal 299 are dispersed and contained in a polymer 298 that has been solidified.

In the liquid crystal display device, since the liquid crystal 299 is held in the solidified polymer 298, it is unnecessary to prepare a glass substrate for each of the liquid crystal layers 295 to 297, which eliminates the color displacement resulting from parallax and reduces the size and weight of the liquid crystal display device. Moreover, each of the liquid crystal layers 255 to 297 can be formed by applying the fluid polymer 298 onto the glass substrate 291 or onto another liquid crystal layer 295 or 296 with a roll coater or spinner and sintering the applied polymer 298 such that it is solidified, resulting in simpler manufacturing process.

However, the polymer dispersed liquid crystal display device has the following drawback.

In recent years, a majority of liquid crystal display devices have adopted an active matrix addressing system wherein switching elements composed of TFTs (Thin Film Transistors) are provided for the respective transparent pixel electrodes of the individual liquid crystal layers to control switching between the application and no application of a voltage to the transparent pixel electrodes. The active matrix addressing system is for increasing a display response speed up to a point where dynamic images can be displayed. When the active matrix addressing system is applied to the foregoing liquid crystal display device, however, switching elements corresponding to transparent pixel electrodes 293 and 294 of the second and third liquid crystal layers 296 and 297 are formed on a glass substrate 291 on which the first liquid crystal layer 295 has been formed since the second and third liquid crystal layers 296 and 297 do not have their own glass substrates, as described above. In addition, it is also necessary to provide multi-level interconnections between the switching elements and the transparent pixel electrodes 234 and 294.

In view of the foregoing, the liquid crystal display device proposed in the foregoing publication has used a negative photosensitive polymer as the polymer 298 which is cured on exposure to UV light. Specifically, the polymer 298 applied to the glass substrate 291 is cured on exposure to UV light except for portions located in the vicinities of the switching elements, while the unexposed portions are removed in a developing agent or the like, resulting in openings. The transparent pixel electrodes 293 and 294 are connected to the switching elements via the openings. However, the exposure of the polymer 298 containing the liquid crystal 299 to UV light causes the degradation of the liquid crystal 299 (particularly the dye contained therein).

As disclosed in Japanese Patent Publication HEI. 8-146456, the present inventors have proposed a liquid crystal display device wherein a transparent pixel electrode can easily be connected to a switching element, which is fabricated as follows. The portions of a glass substrate corresponding to individual pixels are subjected to etching using a solution containing a hydrofluoric acid as the main component to form concave portions. To the concave portions, a polymer containing a liquid crystal is transferred by printing or like technique, similarly to the foregoing liquid crystal display device, resulting in a liquid crystal layer. This reduces the distance between the transparent pixel electrode formed on the liquid crystal layer and the surface of the unetched portion of the glass substrate, so that the transparent electrode is easily connected to the switching elements. However, the liquid crystal display device is disadvantageous in that the step of forming the concave portions requires considerable labor.

In the foregoing liquid crystal display device with the liquid crystal layers 295, 296, and 297 formed from the polymer 298 applied onto the glass substrate 291, a pinhole is easily formed in the applied polymer 298 due to uneven coating or residual bubbles, while projecting or depressed portions are frequently observed on the surfaces of the liquid crystal layers 295, 296, and 297 because of the droplets of the liquid crystal 299 broken and flowing out due to a difference in thermal expansion coefficient between the polymer 298 and the liquid crystal 299. The pinhole causes a short circuit between the transparent pixel electrodes 292 to 294, while the projecting or depressed portions cause discontinuities (disconnections) in the transparent pixel electrodes 292 to 294. Even when no pinhole is observed, if the uneven coating of the polymer 298 has an extremely thin portion, a short circuit is caused by a dielectric breakdown when a voltage is applied to the transparent electrodes 292 to 294. In any case, normal display is prohibited.

Moreover, the walls of the polymer 298 containing the droplets of the liquid crystal 299 should be formed sufficiently thick (0.3 to 0.5 $\mu$m) not to be broken easily. Accordingly, the portion without the liquid crystal accounts for an area ratio of about 30% to 60%, which is considerably high. As a result, the effective aperture ratio is reduced and satisfactorily high contrast cannot be obtained.

The present inventors have also proposed another liquid crystal display device with a view to eliminating the color displacement resulting from parallax and providing improved contrast, which is fabricated as follows. A resist patterned into a specified configuration is formed on a glass substrate, followed by an insulating film and a transparent pixel electrode formed thereon. The resist is then exposed to UV light and removed in a developing agent so as to form a gap between the glass substrate and the insulating film, into which a guest-host liquid crystal is injected. Similarly to the foregoing gap, openings for providing connection between the transparent pixel electrode and a switching element on the glass substrate, such as those described above in the polymer dispersed liquid crystal display device, are also formed easily.

Since the liquid crystal display device comprises, in place of a thick glass substrate, the insulating film that can be formed extremely thin to seal the liquid crystal, the color displacement resulting from parallax is eliminated. In addition, since the gap is filled with the liquid crystal and does not contain a foreign substance (a polymer resin as a dispersed phase), the contrast can easily be increased to a certain extent. However, the liquid crystal display device has the following problem to be solved.

Since the resist dissolved in the developing agent is blocked by the insulating film and less likely to be diffused, the resist is not equally removed when an inlet for the developing agent is small, which may lower the production yield. If the inlet for the developing agent is enlarged, on the other hand, it becomes difficult to provide an aperture ratio greatly higher than the aperture ratio of the foregoing polymer dispersed liquid crystal display device.

The following are problems common to some of the foregoing conventional liquid crystal display devices, which concern a reduction in display performance.

A typical liquid crystal display device having a liquid crystal layer composed of a liquid crystal filled in a space between a pair of glass substrates or sealing films employs spacers to maintain the liquid crystal layer at a given thickness, exclusive of the polymer dispersed liquid crystal display device. In the case of using transparent spacers, they form luminescent spots, which are inevitably displayed on a screen. In the case of using black spacers, they form black spots, which are inevitably displayed on the screen. Since each layer has spacers in a liquid crystal display device of tri-layered structure, the area occupied by the spacers is large relative to the entire area of the screen. Consequently, the spacers exert a great influence on the conventional liquid crystal display device of tri-layered structure.

In a reflection-type color liquid crystal display device having three guest-host liquid crystal layers of cyan, magenta, and yellow as well as a reflector film disposed on the back surface, even when the liquid crystal layers are stacked by measuring the respective absorption spectra of the individual colors and determining the dye concentrations and thicknesses of the liquid crystal layers such that monochrome display is achieved in the ON or OFF state, both white and black are slightly tinted with a color, especially with the color of the foreground liquid crystal layer.

SUMMARY OF THE INVENTION

To overcome the foregoing problems, the present invention in first and second modes have the following features and structures.

Present Invention in First Mode

According to a first aspect of the present invention, there is provided a liquid crystal display device comprising a substrate and a liquid crystal layer disposed on the substrate, the liquid crystal layer having therein microcapsules each containing a liquid crystal and a binder for binding the microcapsules, the binder being composed of a photosensitive polymer material.

According to a second aspect of the present invention, there is provided a liquid crystal display device composing a substrate and a liquid crystal layer disposed on the substrate, the liquid crystal layer having therein microcapsules each containing a liquid crystal and a binder for binding the microcapsules, wall films of the microcapsules and the binder being composed of a photosensitive polymer material.

According to a third aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein microcapsules each containing a liquid crystal and a binder for binding the microcapsules, the binder being composed of a photosensitive polymer material.

According to a fourth aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein microcapsules each containing a liquid crystal and a binder for binding the microcapsules, wall films of the microcapsules and the binder being composed of a photosensitive polymer material.

According to a fifth aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein microcapsules-each containing a liquid crystal and a binder for binding the microcapsules, the liquid crystal display device further comprising an insulating layer interposed between the pixel electrode on the substrate and the liquid crystal layer or between the pixel electrode interposed between the liquid crystal layers and the liquid crystal layer, the binder and the insulating layer being composed of a photosensitive polymer material.

According to a sixth aspect of the present invention, in the liquid crystal display device of the fifth aspect of the present invention, the binder and the insulating layer are composed of the same photosensitive polymer material.

According to a seventh aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein microcapsules each containing a liquid crystal and a binder for binding the microcapsules, the liquid crystal display device further comprising an insulating layer interposed between the pixel electrode on the substrate and the liquid crystal layer or between the pixel electrode interposed between the liquid crystal layers and the liquid crystal layer, wall films of the microcapsules, the binder, and the insulating layer being composed of a photosensitive polymer material.

According to an eight aspect of the present invention, in the liquid crystal display device of the seventh aspect of the present invention, the wall films of the microcapsules, the binder, and the insulating layer are composed of the same photosensitive polymer material.

According to a ninth aspect of the present invention, in the liquid crystal display device of any one of the first to eighth aspects of the present invention, the photosensitive polymer material is a photodegradable polymer material.

According to a tenth aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer containing a polymer dispersed liquid crystal comprising droplets of liquid crystal and a polymer resin matrix composed of a photodegradable polymer material, the droplets of liquid crystal being dispersed and held in the polymer resin matrix.

According to an eleventh aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein a polymer dispersed liquid crystal comprised of droplets of liquid crystal and a polymer resin matrix composed of a photodegradable polymer material, the droplets of liquid crystal being dispersed and held in the polymer resin matrix, the liquid crystal display device further comprising an insulating layer interposed between the pixel electrode on the substrate and the liquid crystal layer or between the pixel electrode interposed between the liquid crystal layers and the liquid crystal layer.

According to a twelfth aspect of the present invention, there is provided a liquid crystal display device comprising: a substrate having a pixel electrode and a driving element; a plurality of liquid crystal layers stacked on the substrate; and a transparent pixel electrode interposed between the stacked liquid crystal layers, the transparent pixel electrode being electrically connected to the driving element provided on the substrate through an opening formed in a specified region of the liquid crystal layer, the liquid crystal layer having therein a polymer dispersed liquid crystal comprised of droplets of liquid crystal and a polymer resin matrix composed of a photodegradable polymer material, the droplets of liquid crystal being dispersed and held in the polymer resin matrix, the liquid crystal display device further comprising an insulating layer composed of a photodegradable polymer material, the Insulating layer being Interposed between the pixel electrode on the substrate and the liquid crystal layer or between the pixel electrode interposed between the liquid crystal layers and the liquid crystal layer.

According to a thirteenth aspect of the present invention, in the liquid crystal display device of any one of the fifth to ninth or of eleventh and twelfth aspects of the present invention, the insulating layer has a thickness ranging from 0.05 to 1 when each the liquid crystal layers has a thickness of 1.

According to a fourteenth aspect of the present invention, in the liquid crystal display device of any one of the first to twelfth aspects of the present invention, the liquid crystal is a liquid crystal containing a dichroic dye or a chiral nematic liquid crystal selectively reflecting visible light.

According to a fifteenth aspect of the present invention, in the liquid crystal display device of any one of the first to twelfth aspects of the present invention, the liquid crystal is a liquid crystal containing a dichroic dye or a chiral nematic liquid crystal selectively reflecting visible light, the liquid crystal display device further comprising a filter for blocking UV light and transmitting the visible light, the filter being disposed on the outer surface of the substrate or of the liquid crystal layer at a largest distance from the substrate.

According to a sixteenth aspect of the present invention, in the liquid crystal display device of any one of the first to twelfth aspects of the present invention, the first liquid crystal layer having therein the liquid crystal containing a cyan or magenta dichroic dye, the second liquid crystal layer having therein the liquid crystal containing the magenta or cyan dichroic dye different in color from the dye contained in the first liquid crystal layer, and the third liquid crystal layer having therein the liquid crystal containing a yellow dichroic dye are stacked on the substrate such that the third liquid crystal layer is located at a largest distance from the substrate having the driving element.

According to a seventeenth aspect of the present invention, in the liquid crystal display device of any one of the first to twelfth aspects of the present invention, the first liquid crystal layer having therein the liquid crystal containing a cyan or magenta dichroic dye, the second liquid crystal layer having therein the liquid crystal containing the magenta or cyan dichroic dye different in color from the dye contained in the first liquid crystal layer, and the third liquid crystal layer having therein the liquid crystal containing a yellow dichroic dye are stacked on the substrate such that the third liquid crystal layer is located at a largest distance from the substrate having the driving element, the liquid crystal display device further comprising a filter for blocking UV light and transmitting visible light, the filter being disposed on the outer surface of the substrate or of the third liquid crystal layer.

According to an eighteenth aspect of the present invention, there is provided a method of manufacturing a liquid crystal display device having two or more liquid crystal layers stacked on a substrate, comprising: a first electrode forming step of forming a first pixel electrode on the substrate formed with first and second driving elements each for controlling a potential at a pixel electrode, the first pixel electrode being connected to the first driving element; a first liquid crystal layer forming step of applying a mixture of microcapsules containing a liquid crystal and a photosensitive polymer material onto the substrate formed with the first pixel electrode to form a first liquid crystal layer on the substrate, an opening forming step of subjecting the first liquid crystal layer to masking exposure and development to remove the portion of the liquid crystal layer overlying an output terminal of the second driving element and thereby forming an opening: and a second electrode forming step of depositing a coating of a conductive material on the first liquid crystal layer formed with the opening to form a transparent second pixel electrode and a connecting line for connecting the second pixel electrode to the output terminal of the second driving element through the opening.

According to a nineteenth aspect of the present invention, there is provided a method of manufacturing a liquid crystal display device having two or more liquid crystal layers stacked on a substrate, comprising: a first electrode forming step of forming a first pixel electrode on the substrate formed with first and second driving elements each for controlling a potential at a pixel electrode, the first pixel electrode being connected to the first driving element; a first liquid crystal layer forming step of applying a mixture of microcapsules containing a liquid crystal and a photosensitive polymer material onto the substrate formed with the first pixel electrode to form a first liquid crystal layer on the substrate; an opening forming step of applying the photosensitive polymer material as a material for forming an insulating layer onto the first liquid crystal layer to form an insulating layer and subjecting the first liquid crystal layer and the insulating layer to masking exposure and development to remove the portions of the first liquid crystal layer and. insulating layer overlying an output terminal of the second driving element and thereby forming an opening; and a second electrode forming step of depositing a coating of a conductive material on the insulating layer formed with the opening to form a transparent second pixel electrode and a connecting line for connecting the second pixel electrode to the output terminal of the second driving element through the opening.

According to a twentieth aspect of the present invention, there is provided a method of manufacturing a liquid crystal display device having three liquid crystal layers stacked on a substrate, comprising the steps of: forming the first liquid crystal layer by applying a mixture of microcapsules each having therein a liquid crystal containing a cyan or magenta dichroic dye and a photosensitive polymer material onto the substrate provided with a first pixel electrode and with first, second, and third driving elements; forming first and second openings by subjecting the first liquid crystal layer to masking exposure and development and thereby removing the portions of the first liquid crystal layer overlying respective output terminals of the second and third driving elements; forming a transparent second pixel electrode, a first connecting line connecting the second pixel electrode to the output terminal of the second driving element through the first opening, and a second connecting line connecting to the output terminal of the third driving element through the second opening by depositing a coating of a conductive material on the first liquid crystal layer formed with the first and second openings; forming a second liquid crystal layer by applying a mixture of the photosensitive polymer material and microcapsules each having therein a liquid crystal containing the magenta or cyan dichroic dye different in color from the dye contained in the first liquid crystal onto the substrate formed with the second pixel electrode and with the first and second connecting line; forming a third opening by subjecting the second liquid crystal layer to masking exposure and development and thereby removing the portion of the second liquid crystal layer overlying the output terminal of the third driving element; forming a transparent third pixel electrode and a third connecting line connecting the third pixel electrode to the output terminal of the third driving element through the third opening by depositing a coating of a conductive material on the second liquid crystal layer formed with the third opening; and placing a third liquid crystal layer having therein a liquid crystal containing a yellow dichroic dye on the third pixel electrode.

According to a twenty-first aspect of the present invention, there is provided a method of manufacturing a liquid crystal display device having three liquid crystal layers stacked on a substrate, comprising the steps of: forming the first liquid crystal layer by applying a mixture of microcapsules each having therein a liquid crystal containing a cyan or magenta dichroic dye and a photosensitive polymer material onto the substrate provided with a first pixel electrode and with first, second, and third driving elements; forming first and second openings by applying the photosensitive polymer material as a material for forming an insulating layer onto the first liquid crystal layer to form a first insulating layer and subjecting the first liquid crystal layer and the first insulating layer to masking exposure and development to remove the portions of the first liquid crystal layer and first insulating layer overlying output terminals of the second and third driving elements; forming a transparent second pixel electrode, a first connecting line connecting the second pixel electrode to the output terminal of the second driving element through the first opening, and a second connecting line connecting to the output terminal of the third driving element through the second opening by depositing a coating of a conductive material on the first liquid crystal layer formed with the first and second openings; forming a second liquid crystal layer by applying a mixture of the photosensitive polymer material and microcapsules each having therein a liquid crystal containing the magenta or cyan dichroic dye different in color from the dye contained in the first liquid crystal onto the second pixel electrode or onto the second pixel electrode and with the first and second connecting lines; forming a third opening by applying the photosensitive polymer material as a material for forming an insulating layer onto the second liquid crystal layer to form a second insulating layer and subjecting the second liquid crystal layer and the second insulating layer to masking exposure and development and thereby removing the portions of the second liquid crystal layer and second insulating layer overlying the output terminal of the third driving element; forming a transparent third pixel electrode and a third connecting line connecting the third pixel electrode to the output terminal of the third driving element through the third opening by depositing a coating of a conductive material on the second liquid crystal layer formed with the third opening; and placing a third liquid crystal layer having therein a liquid crystal containing a yellow dichroic dye on the third pixel electrode or on the third pixel electrode and connecting line.

According to a twenty-second aspect of the present invention, in the method of manufacturing a liquid crystal display device of the nineteenth or twenty-first aspect of the present invention, each of the insulating layer is formed to have a thickness ranging from 0.05 to 1 when the liquid crystal layer in contact with the insulating layer has a thickness of 1.

According to a twenty-third aspect of the present invention, in the method of manufacturing a liquid crystal display device of any one of the eighteenth to twenty-second aspects of the present invention, the photosensitive polymer material is a photodegradable polymer material and the opening is formed by exposing to light only the portion of the liquid crystal layer to be formed with the opening or the portions of the insulating layer and liquid crystal layer to be formed with the opening overlying the output terminal of the driving element for which the opening is to be formed, developing the exposed portion or portions, and thereby removing the portion of the liquid crystal layer or the portions of the liquid crystal layer and insulating layer overlying the output terminal.

Preset Invention in Second Mode

According to a twenty-fourth aspect of the present invention, there is provided a liquid crystal display device having a display layer comprising: a liquid crystal layer composed of a liquid crystal sealed between a substrate and a sealing plate; a support member interposed between the substrate and the sealing plate to support the sealing plate; and an electrode formed on a surface of the sealing plate other than a sealing surface thereof, the support member and the sealing plate being made of a polymer having the same composition and formed integrally with each other to hold the liquid crystal layer.

The arrangement minimizes the thickness of the sealing plate supported by the support member. Consequently, the liquid crystal display device can be driven at a low voltage. Moreover, since the glass substrate is no more necessary, bright display free from parallax is achieved. Furthermore, since the area occupied by the liquid crystal is large relative to the entire area occupied by the liquid crystal display device, an effective aperture ratio Is increased, resulting in higher contrast.

According to a twenty-seventh aspect of the present invention, in the foregoing structure, the liquid crystal layer is composed of three layers and at least the two layers thereof closer to the substrate are held by the display layer.

Since the two liquid crystal layers closer to the substrate require a multi-level interconnection, the effect of the present invention is achieved only when the structures of the two layers are identical with that of the display layer described above. However, since the liquid crystal layer at the largest distance does not require the multi-level interconnection, the effect of the present invention is achieved even when the structure of the outermost liquid crystal layer is not identical with that of the display layer described above. This is why the foregoing arrangement is implemented.

According to twenty-eighth and thirtieth aspects of the present invention, the three liquid crystal layers contain dichroic dyes of different colors and the support member in each of the display layers has the same color as the dichroic dye contained in the corresponding liquid crystal layer.

The arrangement minimizes the influence of the spacers, so that the display performance of the liquid crystal display device is significantly improved.

According to a thirty-second aspect of the present invention, the three stacked liquid crystal layers contain dichroic dyes of different colors, a reflecting film is formed on a surface of the substrate or on the liquid crystal layer at the largest distance from the substrate, and respective ratios of actual absorbances to theoretical absorbances of the dichroic dyes in the three liquid crystal layers are determined to be in decreasing order of magnitude toward the outermost liquid crystal layer.

The arrangement prevents the liquid crystal layers closer to the surface from presenting the deeper color, so that a color tint is suppressed in monochrome display.

According to a thirty-third aspect of the present invention, there is provided a method of manufacturing a liquid crystal display device, comprising: a film formation step of applying a solution mixture of a polymer precursor and a liquid crystal to one surface of a substrate to form a film of the solution mixture on the substrate; a sealing-plate producing step of polymerizing the polymer precursor at a surface of the film to produce a sealing plate; a support-member producing step of exposing a specified portion of the substrate to UV light and thereby polymerizing the polymer precursor in the film to produce a support member; and an electrode producing step of producing an electrode on the sealing plate.

In accordance with the method, it is not necessary to provide an extra step of injecting a liquid crystal. Consequently, the manufacturing process of the liquid crystal display device is simplified and the production yield is improved, resulting in a remarkable reduction in the manufacturing cost of the liquid crystal display device.

According to a fortieth aspect of the present invention, there is provided a method of manufacturing a liquid crystal display device composed of a liquid crystal sealed between a substrate and a sealing film provided with a support member interposed therebetween, comprising the steps of: forming the support member on the substrate; forming the sealing film on a plate-like member, transferring the sealing film formed on the plate-like member to the support member formed on the substrate; and injecting the liquid crystal into a space between the substrate and the sealing film.

By thus transferring the sealing film formed on the surface of the plate-like member to the substrate, the sealing film can be handled with greater ease than in the case where the sealing film is composed of a film-like plastic substrate and handled singly. This allows a significant reduction in the thickness of the sealing film and facilitates the lowering of the drive voltage for the liquid crystal. Moreover, since it is unnecessary to provide walls defining a microcapsule in which the liquid crystal is encapsulated, the contrast can greatly be improved by increasing the effective aperture ratio.

According to a forty-sixth aspect of the present invention, prior to the transfer step, a sealant layer for bonding the substrate to the sealing film is formed on a peripheral portion of a liquid crystal injection region of the substrate, the liquid crystal is filled in the region enclosed by the sealant layer, and the sealing film formed on the plate-like member is transferred singly or in conjunction with the support member to perform the transfer step and the injection step simultaneously.

This eliminates the necessity for an extra step of injecting the liquid crystal and simplifies the manufacturing process.

According to a forty-seventh aspect of the present invention, similar steps are repeated to form a plurality of liquid crystal injection layers.

This facilitates the lamination of the plurality of liquid crystal injection layers employing extremely thin sealing films and the lowering of parallax with respect to each of the liquid crystal injection layers.

According to a forty-ninth aspect of the present invention, the sealing film is composed of a photosensitive material and the foregoing method of manufacturing a liquid crystal display device further comprises the step of subjecting the sealing film to exposure to light and development to form, in the sealing film, an opening for electrode through which electrical conduction is provided.

This facilitates the formation of the opening for the electrode connecting the pixel electrode provided on the sealing film to the thin film transistor provided on the substrate. In the case where an energy-beam irradiation step is performed to provide adhesion between the support member and the sealing film, the opening can be formed simultaneously, which simplifies the manufacturing process.

According to a fiftieth aspect of the present invention, the transfer step includes inhibiting transfer of a specified portion of the sealing film formed on the plate-like member to form, in the sealing film, an opening for an electrode through which electrical conduction is provided.

This allows the opening to be formed simultaneously with the step of transferring the sealing film and thereby simplifies the manufacturing step.

According to a fifty-second aspect of the present invention, there is provided a method of manufacturing a liquid crystal display device comprising a liquid crystal sealed between a substrate and a sealing film, the method comprising the steps of: forming an evaporable solid film on the substrate; forming the sealing film on the solid film; forming a gap between the substrate and the sealing film by evaporating and discharging the solid film; and injecting the liquid crystal into the gap.

By thus forming the sealing film on the surface of the solid film, the sealing film can be handled with greater ease than in the case where the sealing film is composed of a film-like plastic substrate and handled singly. This allows a significant reduction in the thickness of the sealing film and facilitates the lowering of the drive voltage for the liquid crystal. Moreover, since it is unnecessary to provide walls defining a microcapsule in which the liquid crystal is encapsulated, the effective aperture ratio can be held high.

According to a fifty-fourth aspect of the present invention, the gap formation step includes evaporating and discharging a specified portion of the solid film to form the gap between the substrate and the sealing film and forming a support member for supporting the sealing film from the remaining portion of the solid film.

This allows the gap for containing the liquid crystal to be formed simultaneously with the formation of the support member for supporting the sealing film and eliminates the necessity for an extra step of forming the support member. As a consequence, the manufacturing process can be simplified.

According to a fifty-fifth aspect of the present invention, more specifically, the solid film is composed of a material which becomes evaporable upon exposure to an energy beam with or without heating such that a specified portion of the solid film is rendered evaporable upon exposure to the energy beam with or without heating. As a consequence, the solid film in its formation step can be handled with greater ease, while the gap and the support member can be formed precisely and easily in desired regions.

According to a fifty-sixth aspect of the present invention, more specifically, the solid film is made of a positive photoresist decomposed from a polymer to a monomer on exposure to UV light, which enables selective evaporation of the solid film.

According to a fifty-eighth aspect of the present invention, the foregoing method of manufacturing a liquid crystal display device further comprises the step of forming, on the substrate, a support member for supporting the sealing film prior to the step of forming the solid film.

This eliminates the necessity to selectively leave the solid film so that it becomes possible to compose the solid film not only of a photosensitive material but also of various other evaporable materials.

According to a fifty-ninth aspect of the present invention, similar steps are repeated to form a plurality of liquid crystal injection layers.

This also facilitates the lamination of the plurality of liquid crystal injection layers using extremely thin sealing films and the lowering of parallax with respect to each of the liquid crystal injection layers.

According to a sixty-first aspect of the present invention, the support member is disposed in the same position in each of the liquid crystal injection layers.

This allows each of the stacked liquid crystal injection layers to have an equal thickness and improves display uniformity.

According to a sixty-second aspect of the present invention, furthermore, each of the support members has a substantially rectangular or oval configuration in a cross section parallel to the sealing film and the support members vertically opposed to each other with the sealing film interposed therebetween have substantially rectangular or oval cross sections extending in different longitudinal directions.

This increases allowance for the displacement of the support member so that each liquid crystal has an equal thickness. The production yield is also improved, resulting in lower manufacturing cost.

According to a sixty-third aspect of the present invention, each of the support members is sufficiently long to extend along a plurality of pixel areas and the support members vertically opposed to each other with the sealing film interposed therebetween and extend in different longitudinal directions.

This allows the liquid crystal in each of the stacked liquid crystal injection layers to have an equal thickness and prevents light passing through a pixel region from being blocked by the support member, so that the effective aperture ratio is held high. This also increases allowance for the displacement of the support member so that each liquid crystal has an equal thickness. The production yield is also improved, resulting in lower manufacturing cost.

BRIEF DESCRIPTION OF THE DRAWINGS

FIGS. 5 illustrate the effect of an insulating layer in Example 1-2, of which: FIG. 5(a) shows a liquid crystal layer applied to the lower substrate formed with electrodes and driving elements; FIG. 5(b) shows a pixel electrode formed on the liquid crystal layer; and FIG. 5(c) shows the pixel electrode and the insulating layer stacked in this order on the liquid crystal layer;

DESCRIPTION OF THE PREFERRED EMBODIMENTS

Examples in First Mode of Invention

Figure 1:
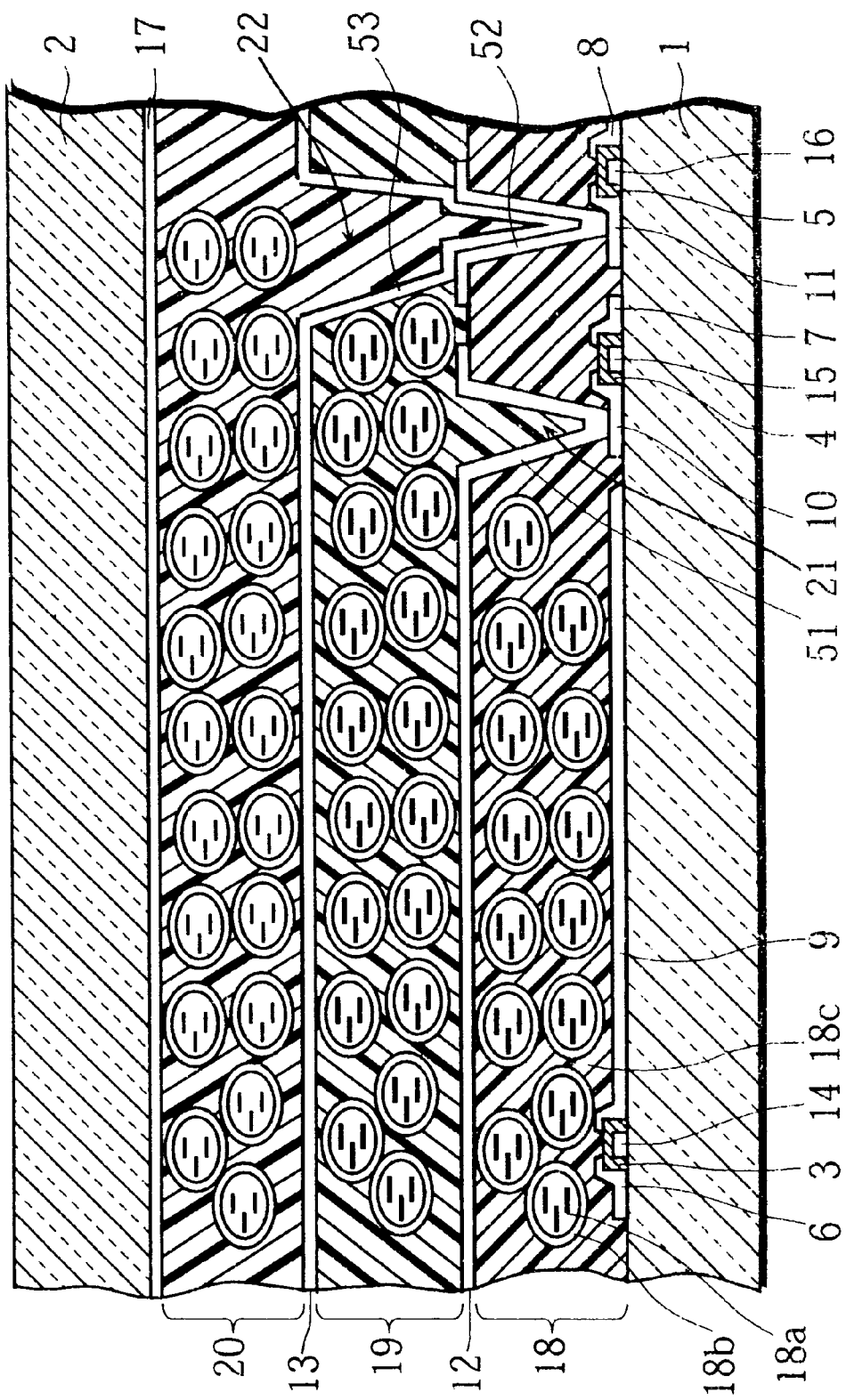
FIG. 1 is a cross-sectional view showing a main portion of a liquid crystal display device according to Example 1—1 of the present invention in a first mode.

Referring now to the drawings, liquid crystal display devices according to embodiments of the present invention in the first mode will be described.

EXAMPLE 1—1

Figure 2:
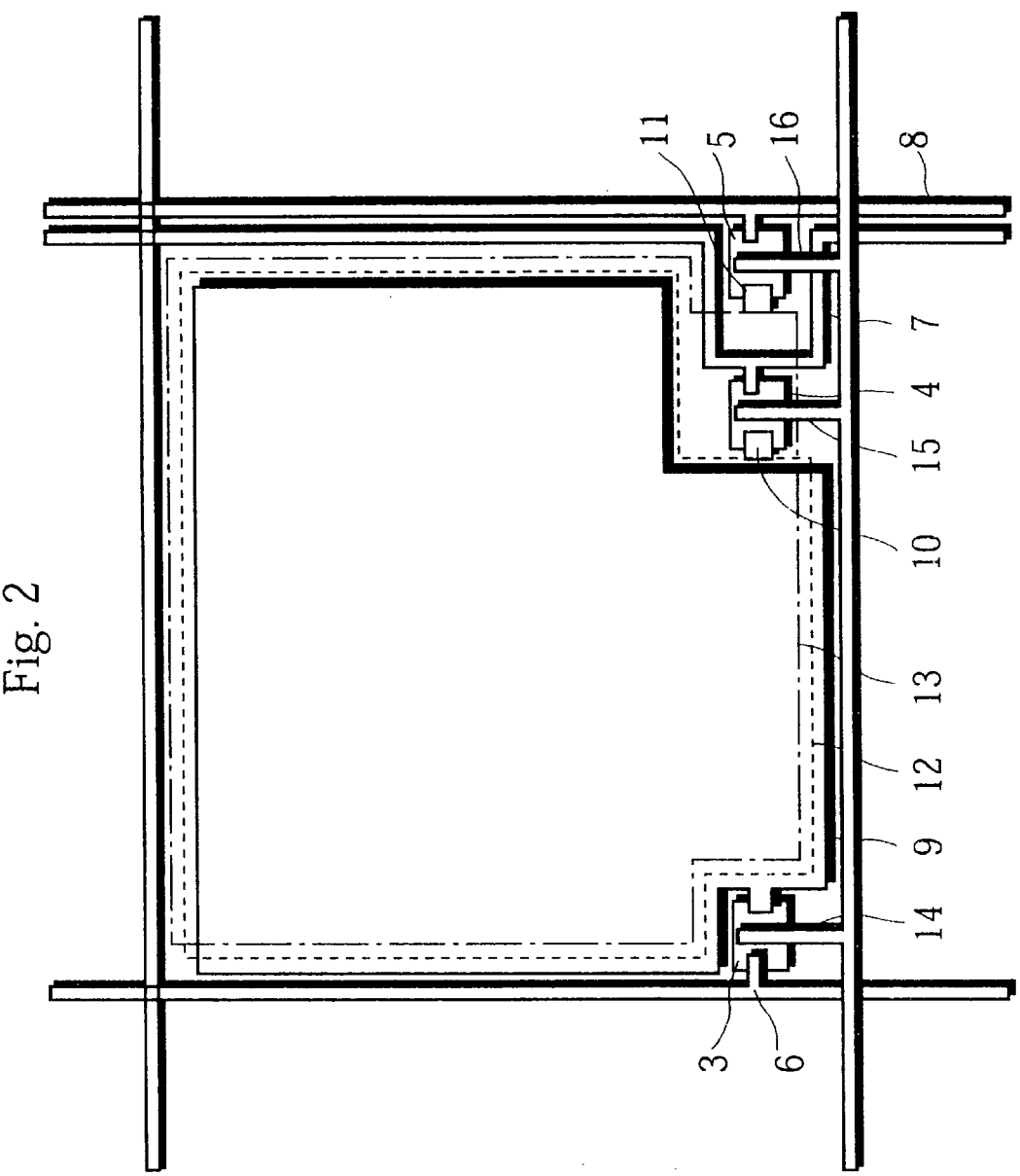
FIG. 2 is a plan view showing the main portion of the liquid crystal display device according to Example 1—1.

FIG. 1 is a cross-sectional view of a liquid crystal display device according Example 1—1 of the present invention in a first mode. FIG. 2 is a plan view showing the layout of the individual components of the liquid crystal display device shown in FIG. 1. In FIGS. 1 and 2, only one pixel at the center of the liquid crystal display device is shown as an example. As for the other pixels on the periphery, the drawing thereof is omitted since they have the same structure.

In FIGS. 1 and 2 are shown: upper and lower substrates 2 and 1 each made of borosilicate glass; first to third thin film transistors 3, 4, and 5 formed on the lower substrate 1; source lines 6, 7, 8 of the thin film transistors; a first pixel electrode 9 formed integrally with a drain electrode of the first thin film transistor 3 to also serve as a reflector plate; a drain electrode 10 of the second thin film transistor 4 to be connected to a second pixel electrode 12; a drain electrode 11 of the third thin film transistor 5 to be connected to a third pixel electrode 13; gate lines 14, 15, and 16 of the thin film transistors; and a common electrode 17.

A first liquid crystal layer 18 is composed of microcapsules and a binder for fixing the microcapsules. More specifically, the first liquid crystal layer 18 comprises: a core substance 18a composed of a guest-host liquid crystal containing a dichroic dye; wall films 18b of the microcapsules composed of a photodegradable polymer material; and a binder 18c composed of a photodegradable polymer material. Each of second and third liquid crystal layers 19 and 20 is also composed of microcapsules having therein a liquid crystal and a binder composed of a photodegradable polymer material.

The guest-host liquid crystal in the first liquid crystal layer 18 contains a cyan dichroic dye. The second and third liquid crystal layers 19 and 20 contain magenta and yellow dichroic dyes, respectively.

The liquid crystal display device according to Example 1—1 is of reflection type utilizing external light, in which the first pixel electrode 9 also serves as the reflector plate. However, it is also possible to implement a liquid crystal display device of transmission type by composing the first pixel electrode of a transparent electrode made of ITO.

In the present specification, photosensitive polymer materials are defined as polymer materials in which chemical reaction is induced by radiation of light. The photosensitive polymer materials are subdivided into a photopolymerizable polymer material having the property of being polymerized under the radiation of light and a photodegradable polymer material having the property of becoming soluble due to depolymerization induced by the radiation of light. If the photodegradable polymer material is dried (at about 90° C. for about 2 minutes) and exposed to UV light, it becomes soluble so that it is washed away in a developing agent of an alkaline solution. If the photodegradable polymer is sintered at about 150° C. for about 1 hour without being exposed to UV light, the polymerization of the molecules proceeds to a point where the photodegradable polymer loses the property of becoming soluble on exposure to light and hence is immobilized, which is convenient for the application of photolithography.

A description will be given to a method of manufacturing the liquid crystal display device.

Initially, the thin film transistors 3, 4, and 5 having semiconductor layers made of amorphous silicon were formed on the lower substrate 1 made of borosilicate glass. The respective source lines 6, 7, and 8 and drain electrodes 9, 10, 11 of the thin film transistors 3, 4, and 5 were formed of an aluminum film. During the process, the drain electrode 9 of the thin film transistor 3 was formed integrally with the pixel electrode. Since the source lines 6, 7, 8 were in the same plane, they were disposed so as not to cross each other. The intersections of the second and third pixel electrodes 12 and 13 and the source lines 6, 7, and 8 are also minimized to reduce capacitive coupling.

As a consequence, the layout shown in FIG. 2 was obtained in which the source lines 6, 7, 8 were disposed adjacent to each other with the minimum intersections of the source line 7 of the third thin film transistor 5 and the pixel electrode 13.

The resulting structure had an increased aperture ratio and a reduced capacitive coupling between the source lines 6, 7, 8 and the pixel electrodes 12 and 13.

On the other hand, the microcapsules each having therein the liquid crystal as the core substance were produced. Specifically, the guest-host liquid crystal was prepared by dissolving about 2 wt % of the cyan dichroic dye in a nematic liquid crystal. Then, 60 g of the guest-host liquid crystal and 40 g of an acrylic positive resist composed of a photodegradable polymer material were dissolved in a proper amount of organic solvent (ethyl methyl ketone), resulting in a solution mixture in which individual components were miscible with each other.

Next, the solution mixture was mixed in water and agitated at 10000 rpm for 2 minutes by using a homogenizer. The agitation allowed the formation of an emulsion in which the droplets of the solution mixture were dispersed in water. The emulsion was held at 85° C. for 10 minutes.

Ethyl methyl ketone in the droplets of the solution mixture was evaporated by the operation and therefore a phase separation occurred between the guest-host liquid crystal and acrylic positive resist miscible with each other, thereby forming microcapsules composed of the guest-host liquid crystal contained in films (wall films) of the acrylic positive resist. Since the microcapsules were formed in water and dispersed in water, the solution was loaded on a centrifuge for removing water therefrom and further subjected to vacuum drying, resulting in the microcapsules having therein the guest-host liquid crystal. The average particle diameter of the microcapsules was approximately 1.5 µm. It is to be noted that the heating temperature was set at 85° C. because it is higher than the boiling point (79.6° C.) of ethyl methyl ketone and lower than the boiling point (100° C.) of water. When ethyl methyl ketone is used as the solvent, the phase separation can properly be caused at the temperature. However, the organic solvent is not limited to ethyl methyl ketone. Various other solvents having boiling points lower than the boiling point (100° C.) of water can be used instead provided that both the guest-host liquid crystal and the photosensitive polymer material can be solved therein and water is not miscible therewith.

The foregoing procedure was performed in a room (yellow room) illuminated only with light of longer wavelengths to which the photodegradable polymer material is not sensitive. This is because the intended object will not be achieved if the photodegradable polymer material reacts with light during the production of the microcapsules (the same shall apply to the photopolymerizable polymer material).

The guest-host liquid crystals containing magenta and yellow dichroic dyes other than the cyan dye and a chiral nematic liquid crystal selectively reflecting visible light, which will be described later, are also microcapsulated.

The microcapsules (containing the cyan dye) thus produced and the acrylic positive resist as the binder are mixed with each other. The mixture is applied to a thickness of about 5 μm onto the substrate 1 by using a roll coater and then dried at a temperature of 90° C. for about 2 minutes, resulting in the first liquid crystal layer 18 formed on the lower substrate 1, in which the microcapsules having therein the liquid crystal containing the cyan dye as the core substance are bound by the binder. The film walls of the microcapsules and the binder are composed of the same photodegradable polymer material.

Next, the lower substrate 1 formed with the liquid crystal layer 18 is exposed to UV light, while being masked except for portions corresponding to openings 21 and 22 (see FIG. 1). The lower substrate 1 is then immersed in the alkaline solution used as the developing agent for the photodegradable polymer material so that the exposed portions of the liquid crystal layer corresponding to the openings 21 and 22 are dissolved and removed in the developing agent, resulting in the openings 21 and 22. At this stage, the structure of the present invention exerts the following effect.

In the present Example 1, the wall films 18b of the microcapsules and the binder 18c for binding the microcapsules dispersed therein are composed of the photodegradable polymer material. Since the photodegradable material become soluble on exposure to UV light, not only the binder 18c but also the wall films 18b of the microcapsules become soluble on exposure to UV light with a mask covering the portion other than the portions corresponding to the openings 21 and 22. This renders the liquid crystal inside the microcapsules more likely to flow out so that, after exposure to UV light, the liquid crystal layer in the vicinities of the openings is easily removed by a washing process using the developing agent.

If the wall films of the microcapsules are composed of a material (other than the photodegradable material) such as polyvinyl alcohol, they do not become soluble upon exposure to UV light and therefore the microcapsules are more likely to remain in the vicinities of the openings after the washing process using the developing agent, which prevents the formation of satisfactory openings.

After the formation of the openings, the lower substrate 1 is sintered at 150° C. for about 1 hour so that the photodegradable material composing the wall films 18b of the microcapsules and the binder 18c is polymerized by heat and the first liquid crystal layer 18 is immobilized.

Subsequently, an ITO film, which is a conductive material, is deposited by sputtering to a thickness of 120 to 150 nm on the first liquid crystal layer 18 formed with the openings and patterned by photolithography to form the second pixel electrode 12. Since the ITO film is also deposited on the inner surface of the opening 21, a connecting line 51 providing electrical conduction between the pixel electrode 12 and the drain electrode 10 also serving as the output terminal of the second thin film transistor 4 is formed simultaneously by the photolithographic process.

The formation of the connecting line 51 enables the potential at the pixel electrode 12 to be controlled by the second thin film transistor 4. On the other hand, no electrical conduction is provided between the pixel electrode 12 and the drain electrode of the third thin film transistor 5 by patterning the pixel electrode 12 into the configuration as shown in FIG. 2.

As described above, the photodegradable polymer material once immobilized will never become soluble on exposure to UV light. Consequently, the first liquid crystal layer 18 is never impaired by the photolithographic process for forming the second pixel electrode 12.

After the foregoing steps, the second liquid crystal 19, the openings 22, and the third pixel electrode 13 are formed on the lower substrate 1 provided with the first liquid crystal layer 18 and with the second pixel electrode 12 in basically the same manner as used above.

Specifically, the guest-host liquid crystal containing the magenta dichroic dye is prepared and microcapsules having therein the guest-host liquid crystal as the core substance are produced. The microcapsules are dispersed in a binder (acrylic positive resist) to form a mixture, which is applied to the lower substrate 1 provided with the first liquid crystal layer 18 and with the second pixel electrode 12 by using a roll coater and dried, resulting in the second liquid crystal layer 19. The second liquid crystal layer 19 is exposed to UV light, while being masked except for the portion corresponding to the opening 22, The exposed portion is washed away in the developing agent to form the opening 22. Thereafter, the liquid crystal layer is sintered and an ITO film is deposited by sputtering on the liquid crystal layer including the opening. The ITO film is then patterned into the configuration as shown in FIG. 2, thereby forming the third pixel electrode 13.

Since the coating is also deposited on the inner surface of the opening 22 by ITO sputtering, electrical conduction is provided between the pixel electrode 13 and the drain electrode 11 of the third thin film transistor 5. As a result, the potential at the pixel electrode 13 can be controlled by the third thin film transistor 5, similarly to the above.

Furthermore, microcapsules having therein the yellow dichroic dye as the core substance are produced in the same manner as used above. The mixture of the microcapsules and the binder is applied onto the lower substrate 1 formed with the first and second liquid crystal layers 18 and 19 and with the second and third pixel electrodes 12 and 13 by using a roll coater. The applied mixture is then sintered to form the third liquid crystal layer 20.

After that, the lower substrate 1 and the upper substrate 2 formed with the common electrode 17 are laminated, resulting in the finished liquid crystal display device.

Although the third liquid crystal layer 20 has been formed on the lower substrate 1 such that the lower substrate 1 and the upper substrate 2 formed with the common electrode 17 are laminated, Example 1—1 of the present invention is not limited to the embodiment. For example, the liquid crystal display device may also be fabricated by forming-the first and second liquid crystal layers 18 and 19 and the second and third pixel electrodes 12 and 13 on the lower substrate 1, while forming the common electrode 17 and the third liquid crystal layer on the upper substrate 2, and laminating the upper and lower substrates 2 and 1.

Since the third liquid crystal layer 20 does not require an opening to be formed therein, a polymer material other than the photosensitive polymer material such as the photodegradable polymer material may also be used in the third liquid crystal layer 20 to compose the wall films of the microcapsules as well as the binder for binding the microcapsules. As an example of such a material, a thermopolymerizable polymer material can be listed.

To hold the third liquid crystal layer 20 between the upper substrate 2 and the lower substrate 1 provided with the first and second liquid crystal layers and with the second and third pixel electrodes 12 and 13, the following method may also be implemented. In accordance with the method, spacers for providing a gap of 2 to 3 μm are dispersed between the lower substrate 1 (third pixel electrode 13) and the upper substrate 2 (common electrode 17) and the circumferential edges of the pixel are sealed except for a portion in which an injection port is to be formed. After that, the resulting call is placed in a vacuum vessel so that the gap is evacuated. With the injection port immersed in the surface of the guest-host liquid crystal, which is to form the third liquid crystal layer, atmospheric pressure is restored in the vessel and the liquid crystal is thereby injected into the gap.

EXAMPLE 1-2

Figure 4:
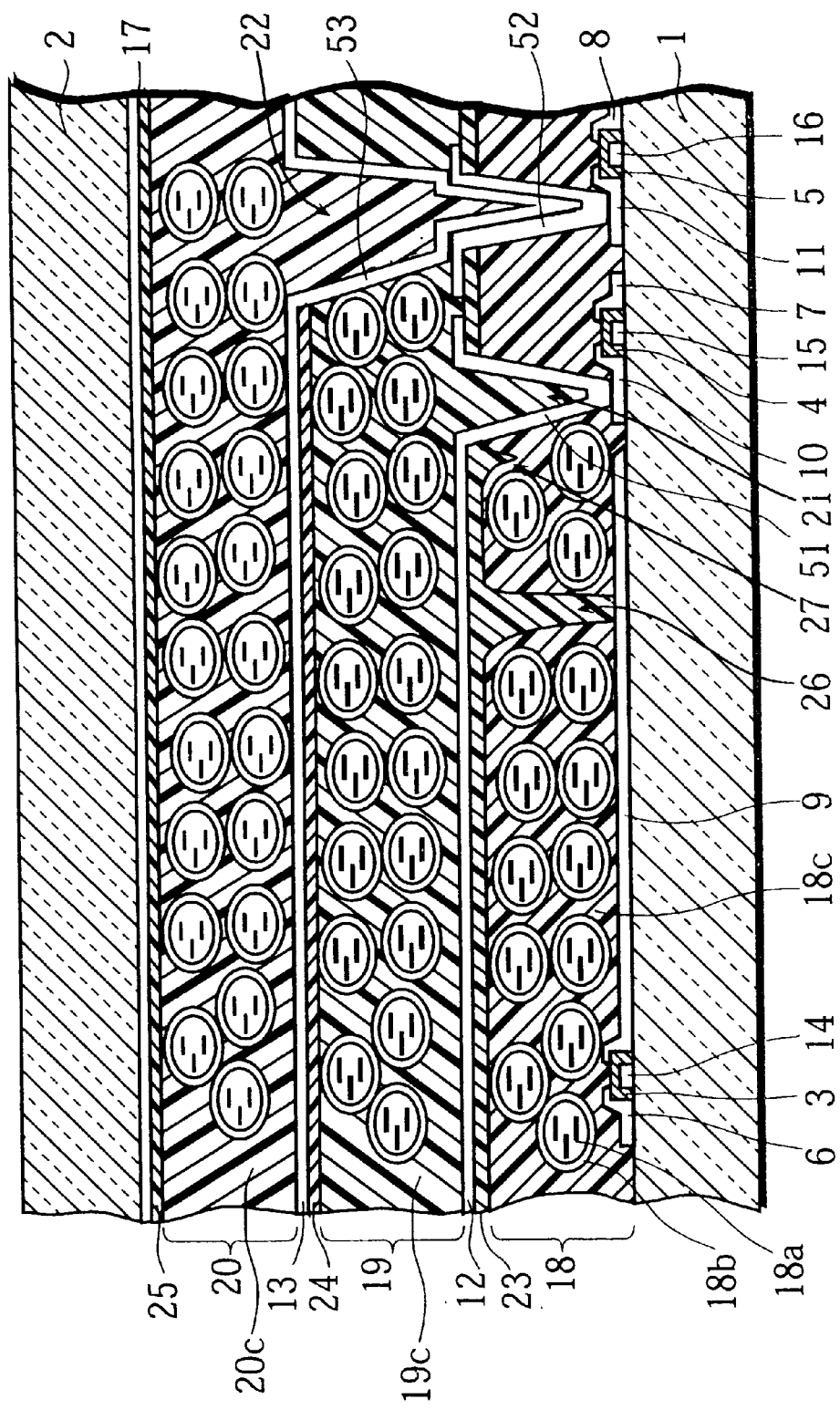
FIG. 4 is a cross-sectional view showing a main portion of a liquid crystal display device according to Example 1-2 of the present invention in the first mode.
Figure 5:
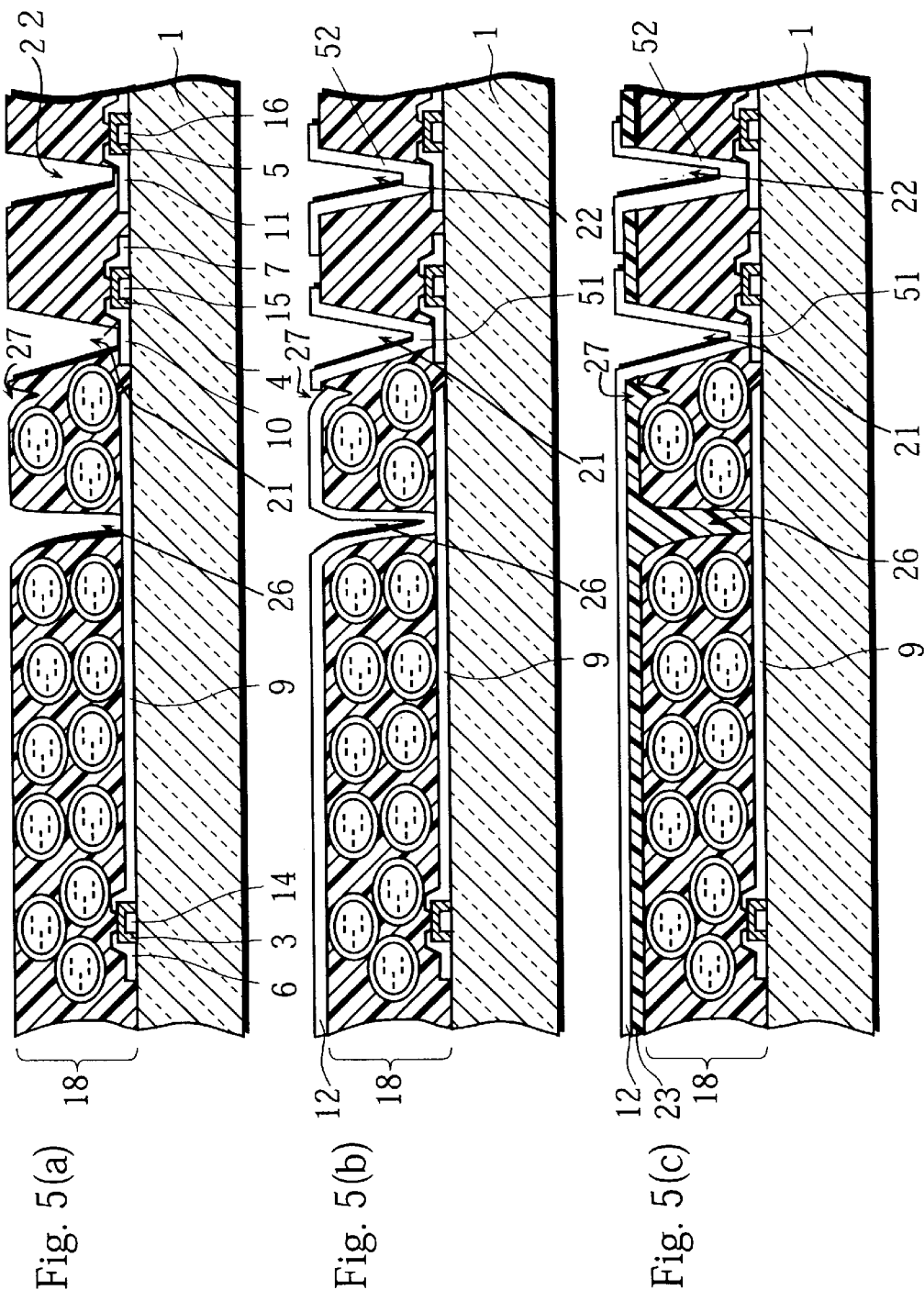
Figure 6:
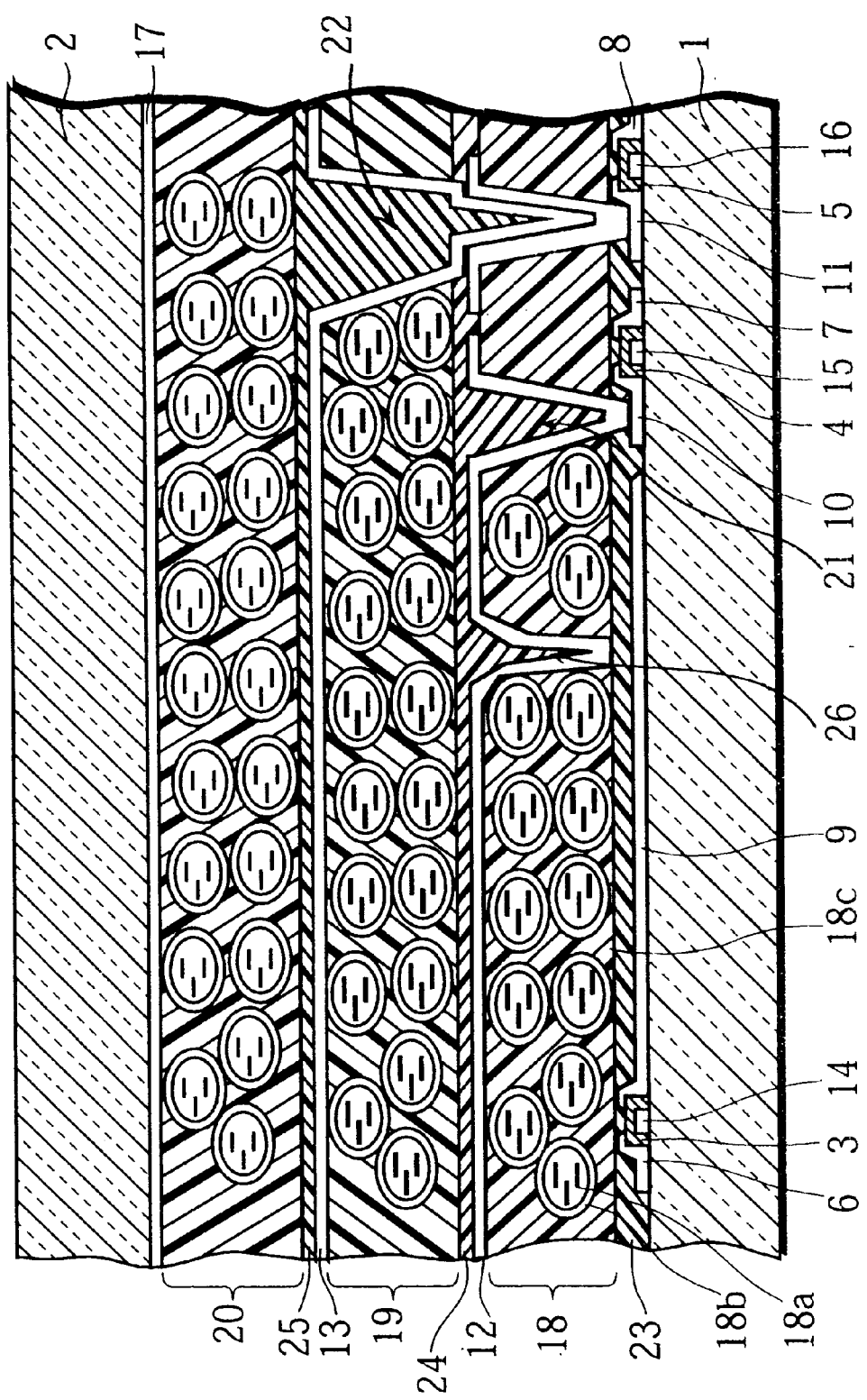
FIG. 6 is a cross-sectional view showing a main portion of a liquid crystal display device according to another embodiment of Example 1-2.

Referring to FIGS. 4 to 6, a liquid crystal display device according to Example 1-2 of the present invention in the first mode will be described.

The liquid crystal display device according to Example 1-2 has the same multi-level structure as that of the liquid crystal display device according to Example 1—1, in which the three liquid crystal layers 18, 19, and 20 containing cyan, magenta, and yellow dichroic dyes are stacked on the lower substrate 1 formed with the thin transistors and with the first pixel electrode 9 also serving as a reflector plate, except that insulating layers are provided on the individual liquid crystal layers.

Therefore, the description will be given primarily to the insulating layers. As for the same component as used in Example 1—1, the description thereof is omitted by providing the same reference numerals.

FIG. 4 shows a cross-sectional view of the liquid crystal display device of Example 1-2. In FIG. 4, one pixel at the center of the liquid crystal display device is shown as a representative, and the drawing of the other pixels on the periphery is partially omitted since they have the same structure.

As shown in FIG. 4, the liquid crystal display device according to Example 1-2 has the multi-level structure in which the pixel electrode 9 also serving as the reflector plate, the first liquid crystal layer 18 containing the cyan dichroic dye, the first insulating layer 23, the second pixel electrode 12, the second liquid crystal layer 19 containing the magenta dichroic dye, the second insulating layer 24, the third pixel electrode 13, the third liquid crystal layer 20 containing the yellow dichroic dye, the third insulating layer 25, the common electrode 17, and the upper substrate 2 are stacked on the lower substrate 1 in this order.

The first and second insulating layers 23 and 24 are provided with openings corresponding in position to the openings 21 and 22 of the first and second liquid crystal layers 18 and 19. Through the openings, the second and third pixel electrodes 12 and 13 are connected to the drain electrodes 10 and 11 of the second and third thin film transistors on the lower substrate 1.

The reason for the provision of the insulating layers composed of a photosensitive polymer material in Example 1-2 will be described with reference to FIGS. 5.

FIG. 5(a) shows the cross section of one pixel at the center of the liquid crystal display device, in which the openings 21 and 22 have been formed by masking exposure and development in the first liquid crystal layer 18 formed on the lower substrate 1. In the liquid crystal display device of Example 1—1, the liquid crystal layer 18 is formed by applying the liquid crystal layer by using a roll coater and subjecting the applied liquid crystal layer to masking exposure and development. The pixel electrode 12 and the connecting lines (electrode lines connecting the pixel electrodes and the driving elements) 51 and 52 are formed by performing ITO sputtering with respect to the liquid crystal layer 18. However, there are cases where the following problems arise if the pixel electrodes are formed directly on the liquid crystal layers.

In applying the liquid crystal layer onto the substrate, a pinhole 26 having a diameter of several micrometers may be formed in the liquid crystal layer 18 due to uneven coating, as shown in FIG. 5(a). In sintering the liquid crystal layer at 150° C. for about 1 hour to polymerize the photodegradable polymer material serving as the binder, the wall films of the microcapsules may be broken due to a difference in thermal expansion coefficient between the liquid crystal in the microcapsules and the wall films of the microcapsules or the surrounding binder. As a consequence, the liquid crystal which is the core substance of the microcapsules may flow out of the liquid crystal layer, so that the pinhole is formed in the liquid crystal layer or the thickness of the liquid crystal layer is reduced locally to a great extent.

If an ITO film is deposited on the liquid crystal layer formed with the pinhole, electrical conduction is provided disadvantageously between the first and second pixel electrodes 9 and 12 through the pinhole 26, as shown in FIG. 5(b). Hence, when a voltage is applied between the two pixel electrodes, a short circuit occurs to allow an excessive current to flow through the driver circuit for the liquid crystal display device, which destroys the driver circuit and causes faulty operation in the liquid crystal display device. In addition, since no voltage is applied between the short-circuited pixel electrodes, pixel defects occur.

If a projecting or depressed portion is produced on the surface of the liquid crystal layer as a result of uneven coating or flowing out of the liquid crystal, the ITO film is discontinued at the site of a projecting or depressed portion 27 as shown in FIG. 5(b), so that no electrical conduction is provided between the pixel electrode and the driving element and the potential at the pixel electrode is no more controlled by the driving element on the substrate.

To eliminate the following problems, Example 1-2 has formed the insulating layer 23 on the side opposite to the lower substrate 1 formed with the driving element through the liquid crystal layer 18, i.e., on the top surface of the liquid crystal layer 18 so that the pixel electrode 12 and the connecting line are formed on the insulating layer 23. The resulting structure is shown in FIG. 5(c), in which the pinhole 26 formed in the liquid crystal layer is filled with the insulating layer 23. Moreover, since the insulating layer 23 evens the surface of the liquid crystal layer formed with the projecting or depressed portion 27, the effect of preventing the faulty operation resulting from the conduction between the pixel electrodes and the discontinued connecting line is achieved.

It is well known to provide a liquid crystal display device with a resin layer (corresponding to the insulating layer of the present invention) for providing insulation between the electrodes and a smooth surface. In the present invention, however, each of the wall films of the microcapsules, the binder, and the insulating layer is composed of the photosensitive polymer material. This allows the insulating layer to be formed without much labor and the resulting insulating layer presents no obstacle to the formation of the opening in the liquid crystal layer.

According to the present invention, the insulating layers 23, 24, and 25 are preferably composed of the same photosensitive polymer material as composing the wall films 18b of the microcapsules and the binders 18c, 19c, and 20c of the liquid crystal layers 18, 19, and 20. This achieves the same refractive index between the wall films of the microcapsules, the binder phase, and the insulating films, so that light loss due to the reflection of light at each interface is remarkably reduced.

If the foregoing insulating layers 23, 24, and 25, the wall films 18b, and the binders 18c, 19c, and 20c are composed of the same photosensitive material, manufacturability in handling a raw material is improved, while the step of forming the openings 21 and 22 in the insulating layers 23 and 24 can be performed simultaneously with the step of forming the openings in the liquid crystal layers IS and 19, as will be described later in a manufacturing method according to Example 1-2, which also achieves the effect of simplifying the process. Thus, the formation of the insulating layer composed of the photosensitive polymer material on each of the liquid crystal layers contributes to improved display performance and improved productivity of the liquid crystal display device.

A description will be given to a method of manufacturing the liquid crystal display device according to Example 1-2.

Similarly to the manufacturing method of the liquid crystal display device of Example 1—1, the first liquid crystal layer 18 was applied onto the lower substrate 1 by using a roll coater and then dried at 90° C. for about 2 minutes, resulting in a liquid crystal layer with a thickness of 5 μm formed on the lower substrate 1. The liquid crystal layer was microscopically observed and the presence of the pinhole 26 (see FIG. 4) having a diameter of several micrometers assumedly resulting from uneven coating was recognized.

Subsequently to the foregoing step, the same photosensitive polymer material as composing the binder 18c was applied dropwise onto the lower substrate 1 formed with the liquid crystal layer 18, followed by sequential rotations at 500 rpm for 5 seconds and at 2000 rpm for 30 seconds on a spinner, so that the lower substrate 1 was evenly coated with the photosensitive polymer material. After that, the applied photosensitive polymer material was dried at 90° C. for about 2 minutes, resulting in the first insulating layer 23 having a thickness (thickness of a flat portion) of 0.5 μm.

The first insulating layer 23 composed of the same photosensitive polymer material as composing the binder of the liquid crystal was thus formed on the first liquid crystal layer 18. During the step of forming the insulating layer 23, the photosensitive polymer material was allowed to flow into the pinhole 26 formed in the first liquid crystal layer 18 and into the projecting or depressed portion 27 on the surface of the liquid crystal layer, thereby filling up the pinhole 26 and the projecting or depressed portion 27 and providing the first insulating layer having a smooth surface with no projection nor depression.

The thickness of the insulating layer can be varied by adjusting the amount of coating, the rotation speed of the spinner, and the rotation time. According to the present invention, the thickness of the insulating layer is preferably adjusted to be in a range of 0.05 to 1 relative to the thickness of the liquid crystal layer, which will be described later.

Next, the first liquid crystal layer 18 formed on the lower substrate 1 and the first insulating layer 23 were subjected to masking exposure and development, similarly to the method of manufacturing the liquid crystal display device, resulting in the openings 21 and 22 formed over the terminal portions of the driving elements on the lower substrate 1, i.e., over the drain electrodes 10 and 11 of the thin film transistors.

Then, the lower substrate 1 was sintered at 150° C. for about 1 hour so that the photosensitive polymer material composing the binder 18c of the first liquid crystal layer 18 and the first insulating layer 23 was polymerized.

During the manufacturing of the liquid crystal display device according to Example 1—1, in the sintering step for polymerizing and immobilizing the photosensitive polymer material composing the wall films of the microcapsules and the binder, there were cases where the microcapsules were broken in the vicinity of the surface of the liquid crystal and the liquid crystal flew out. In Example 1-2, however, no breakage of the microcapsules or no flowing out of the liquid crystal was recognized due to the provision of the insulating layers.

In Example 1—1, the microcapsules were broken and the liquid crystal flew out because of a difference in thermal expansion coefficient between the liquid crystal inside the microcapsules and the photodegradable polymer material composing the wall films of the microcapsules and the binder. By contrast, Example 1-2 is free from the breakage of the microcapsules and the like since the insulating layers function as the protective films for the liquid crystal layers and impart thereto sufficient mechanical strength to withstand thermal expansion, thereby suppressing breakage or the like.

On the insulating layer 23, the pixel electrode 12 and the connecting lines 51 and 52 for connecting the pixel electrode 12 and the terminal of the corresponding driving element on the lower substrate 1 were further formed in the same manner as used in Example 1—1.

Thereafter, the second liquid crystal layer 19, the second insulating layer 24, the third pixel electrode 13, and the connecting line 53 are deposited sequentially in the same manner as used in Example 1—1. Subsequently, the third liquid crystal layer 20, the third insulating layer 25, the common electrode 17, and the upper substrate 2 are formed in the same manner as used in Example 1—1, whereby the liquid crystal display device is completed.

In accordance with the manufacturing method of Example 1-2, the ratio of the thickness of the insulating layer to the thickness of the liquid crystal layer is preferably in the range of 0.05 to 1 for the following reason.

To maintain high accuracy in photolithographic processing for forming the opening in the liquid crystal layer, the total thickness of the liquid crystal layer in which the openings are to be formed and the insulating layer should be 10 μm or less. To obtain satisfactory display performance, however, the liquid crystal layer having a thickness of about 5 μm is required. On the other hand, a voltage applied to the liquid crystal layer provided with the insulating layer is divided between the liquid crystal layer and the insulating layer. To efficiently apply the voltage to the liquid crystal layer, therefore, the thickness of the insulating layer is desirably minimized. If the thickness of the insulating layer is reduced under 0.5 μm, however, the effect of filling in the pinhole or the like cannot be expected, so that the significance of providing the insulating layer is lost.

When the total thickness of the liquid crystal layer and the insulating layer is controlled to be about 10 μm or less in terms of accuracy in photolithographic processing and the thickness of the insulating layer is controlled to be about 5 μm or more in terms of display performance, the thickness of the insulating layer should be equal to or less than that of the liquid crystal layer. To render the provided insulating layer effective, on the other hand, the thickness of the insulating layer should be about 0.5 μm or more, which is achieved by adjusting the thickness ratio of the insulating layer to the liquid crystal layer to be in the range of 0.05 to 0.1.

The liquid crystal display device capable of full-color display according to Example 1-2 has thus been fabricated. Since the manufacturing method has used the same photosensitive polymer material to compose the insulating layer, the wall films of the microcapsules, and the binder and formed the openings by depositing the insulating layer on the liquid crystal layer still unformed with openings and subjecting the two layers to masking exposure and development, the masking exposure and development of the liquid crystal layer can be performed simultaneously with the masking exposure and development of the insulating layer.

By thus simply adding the step of applying and drying the insulating layer to the manufacturing method of Example 1—1, the manufacturing method provides the liquid crystal display device free from a short circuit between the pixel electrodes resulting from a pinhole formed in the liquid crystal layer and from a disconnection or discontinuity in the connecting line resulting from a projecting or depressed portion in the surface of the liquid crystal layer, irrespective of the structure in which the pixel electrodes are connected to the terminal portions of the corresponding driving elements on the substrate through the liquid crystal layers and the insulating layers.

Moreover, since the wall films of the microcapsules, the binder, and the insulating layers are composed of the same photodegradable polymer material in the manufacturing method, irregular reflection of light is seldom observed at the interface between the liquid crystal layer and the insulating layer and at the interface between the wall films of the microcapsules and the binder phase. Hence, there can be implemented the liquid crystal display device excellent in brightness with reduced light loss.

Although the masking exposure, development, sintering of the liquid crystal layer have been performed simultaneously with those of the insulating layer, it is also possible to perform the masking exposure, development, and sintering of the liquid crystal layer first, form the insulating layer on the liquid crystal layer, and then perform the masking exposure, development, and sintering of the insulating layer. The method also prevents faulty operation resulting from the pinhole or projecting or depressed portion in the surface of the liquid crystal layer.

As shown in FIG. 6, the liquid crystal layers, the pixel electrodes, and the insulating layers may also be stacked in a different order. In the drawing, the pixel electrode 9 also serving as the reflector plate, the first insulating layer 23, the first liquid crystal layer 18 containing the cyan dichroic dye, the second pixel electrode 12, the second insulating layer 24, the second liquid crystal layer 19 containing the magenta dichroic dye, the third pixel electrode 13, the third insulating layer 25, the third liquid crystal layer 20 containing the yellow dichroic dye, the common electrode 17, and the upper substrate 2 are stacked in this order on the lower substrate 1, while the first, second, and third insulating layers 23, 24, and 25 are formed under the first, second, and third liquid crystal layers 18, 19, and 20, respectively. In this case also, there can be obtained the effect of preventing a short circuit between the pixel electrodes resulting from the pinhole formed in the liquid crystal layer. This is because the first insulating layer 23 formed between the first pixel electrode 9 and the first liquid crystal layer 18 provides insulation between the first and second pixel electrodes 9 and 12 and hence no electrical conduction is achieved therebetween, though the first and second pixel electrodes 9 and 12 are partially brought in close proximity by the pinhole 6 formed in the first liquid crystal layer 18, as shown in FIG. 6.

However, since the insulating films are provided only under the liquid crystal layers, the effect of preventing the connecting line from being discontinued at the site of the depression cannot be achieved when the projecting or depressed portion is formed in the surface of the liquid crystal layer. In the case of providing the insulating layers only on one sides of the liquid crystal layers, therefore, the structure of Example 1—1 in which the insulating layers are provided on the upper sides of the liquid crystal layers is preferably used.

The liquid crystal display device in which the insulating layers are provided under the liquid crystal layers can be fabricated by reversing the order of the step of forming the first liquid crystal layer and the step of forming the first insulating layer in the method of manufacturing the liquid crystal display device according to Example 1-2. Specifically, the first insulating layer is formed on the lower substrate 1 formed with the first pixel electrode 9 and then dried. Then, the first liquid crystal layer is applied onto the first insulating layer, dried, and subjected to masking exposure and development so that the openings 21 and 22 are formed therein.

Although the insulating layers are provided on only one sides of the liquid crystal layers in Example 1-2, the insulating layers may be provided on both sides of the liquid crystal layers. Although the provision of the insulating layers on both sides of the liquid crystal layers increases the number of process steps, the insulating layers exert more positive effects.

Although the liquid crystal display device of Example 1-2 has been fabricated by preparing the top substrate 2 previously formed with the common electrode 17 and laminating the top substrate 2 and the lower substrate 1 formed with the first to third liquid crystal layers 18 to 20, there is no possibility of electrical conduction between the third pixel electrode 13 and the common electrode 17 even when a pinhole has been formed in the third liquid crystal layer 20, since the manufacturing method of Example 1-2 does not involve ITO sputtering performed with respect to the surface of the third liquid crystal layer 20 to form the electrode. Hence, the third insulating layer 25 need not necessarily be provided if the function of the insulating layer is limited to providing insulation between the pixel electrode and the common electrode, though it has been provided in Example 1-2.

However, the insulating layer 25 formed on the third liquid crystal layer achieves the effect of planarizing the surface of the third liquid crystal layer, which enables uniform lamination of the lower substrate 1 and the upper substrate 2 (actually the insulating layer 25 and the common electrode 17).

EXAMPLE 1-3

Figure 7:
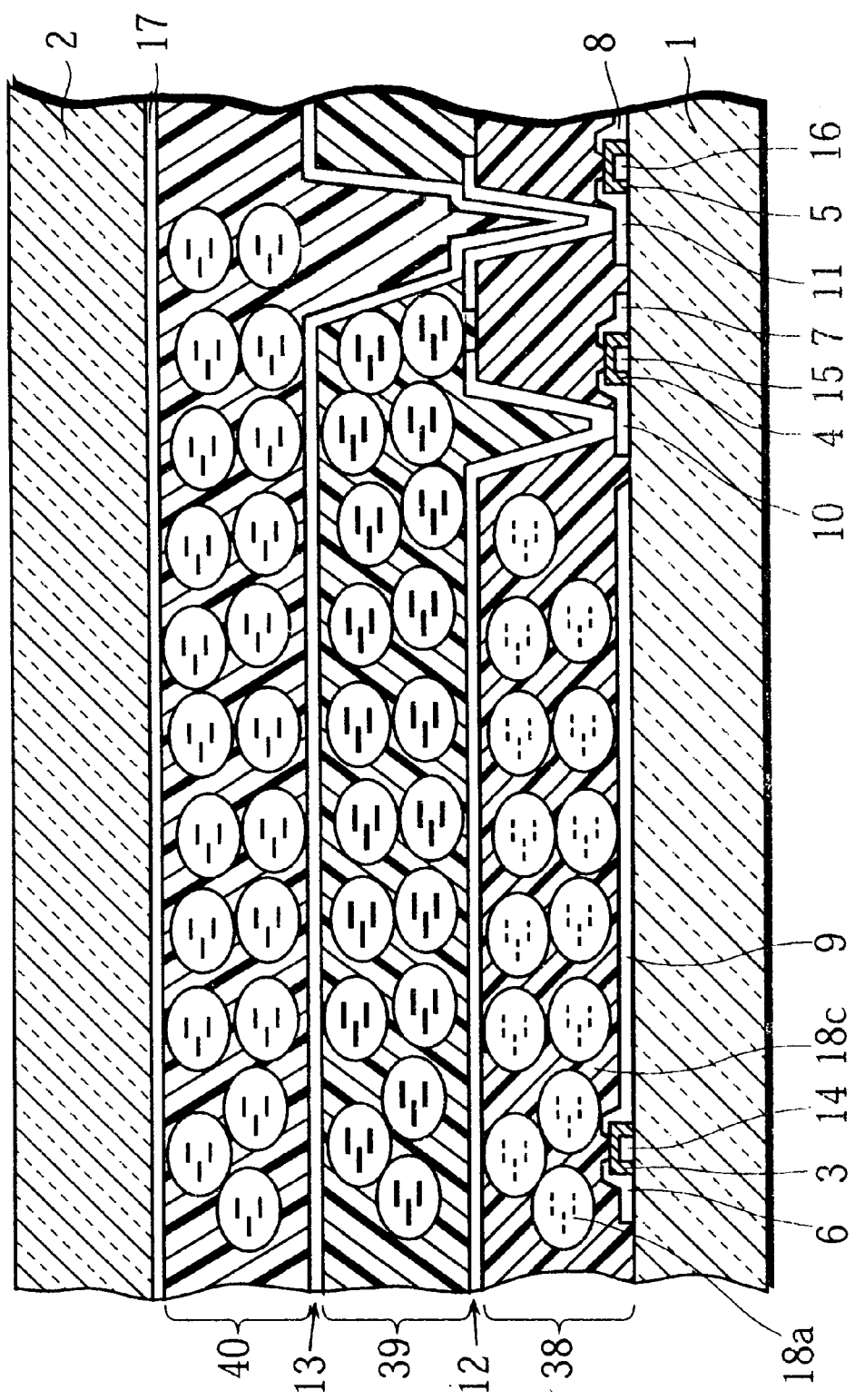
FIG. 7 is a cross-sectional view showing a main portion of a liquid crystal display device according to Example 1-3 of the present invention in the first mode.

Referring to FIG. 7, a liquid crystal display device according to Example 1-3 of the present invention will be described. As for the same components as used in Example 1—1, the description thereof is omitted by providing the same reference numerals.

By contrast to the liquid crystal display device according to Example 1—1 composed of the stacked liquid crystal layers in each of which the microcapsules having therein the liquid crystal are held in the binder, the liquid crystal display device according to Example 1-3 is obtained by stacking layers of a so-called polymer dispersed liquid crystal in each of which droplets of a liquid crystal are dispersed and held in a photosensitive polymer material, as shown in FIG. 7.

The liquid crystal display device of Example 1-3 that features the lamination of polymer dispersed liquid crystal layers was fabricated as follows. Initially, the first to third thin film transistors 3 to 5 and the first pixel electrode 9 were formed on the lower substrate 1, similarly to Example 1—1.

On the other hand, a nematic liquid crystal containing about 2% of the cyan dichroic dye was dissolved in a positive resist to prepare a solution mixture containing the liquid crystal and a photosensitive polymer material. The positive resist used here contains the photodegradable polymer material and a solvent at a composition ratio of 30% to 70%. The mixture ratio of the positive resist to the liquid crystal (containing the cyan dye) was adjusted such that the weight ratio of the photodegradable polymer to the liquid crystal in the solution mixture was 3:7. In the solution mixture thus prepared, the liquid crystal containing the dichroic dye, the photodegradable polymer material, and the solvent were miscible with each other.

By using a spinner, the mixture solution was applied to a thickness of about 5 $\mu$m onto the lower substrate 1 and dried on a hot plate oven at 90° C. for about 2 minutes. The solvent in the mixture solution applied onto the lower substrate 1 was evaporated and brought out of the system by the drying operation, so that the concentration of the solute in the solution mixture increased. When the increasing concentration reached a given value, the photosensitive polymer material and the liquid crystal material which had been miscible with each other were separated, resulting in the polymer dispersed liquid crystal layer (first liquid crystal layer 38) in which the droplets of the liquid crystal were dispersed and held in a matrix of photosensitive polymer material.

The first liquid crystal layer 38 is then subjected to masking exposure using a mask covering the first liquid crystal layer 38 except for portions corresponding to openings, similarly to Example 1—1, so that the openings 21 and 22 are formed in specified regions. The process including the present and subsequent steps is the same as that of Example 1—1, except that the polymer dispersed liquid crystal layer is used. Therefore, the description of the subsequent steps will be omitted.

According to Example 1-3 using the polymer dispersed liquid crystal layer, the phase separation after the application of the solution mixture enables the formation of the structure in which the liquid crystal material is dispersed and held in the photosensitive polymer material. Accordingly, it is not necessary to prepare microcapsules having therein the liquid crystal material as the core substance in advance.

In the liquid crystal display device according to Example 1-3, it is also possible to provide the insulating layer as described in Example 1-2, similarly to Example 1-2.

Other Embodiments

The specific embodiments described in Examples 1—1, 1-2, and 1-3 are primarily for elucidating the art disclosed by the present invention and the present invention in the first mode not limited thereto. Various modifications may be made of the present invention in the first mode without departing from the scope thereof. For examples, the modifications may be implemented as follows.

(1) Although the structure in which the three liquid crystal layers are held between the two glass substrates has been used in each of Examples 1—1, 1-2, and 1-3, similar effects can be achieved by the structure in which three liquid crystal layers are stacked on a single glass substrate. In this case, the common electrode is formed by depositing an ITO film by sputtering on the substrate formed with the third liquid crystal layer. The structure suppresses the lowering of transmittance due to the glass substrate and reduces the weight of the liquid crystal display device.

In the structure, it is desirable to provide a protective film for protecting the liquid crystal layer over the foregoing liquid crystal layer (over the common electrode). The protective film may be composed of an UV curing acrylic resin.

(2) In the case of using outdoors the liquid crystal display device, the liquid crystal layers are irradiated with UV light contained in sunshine or the like so that the dichroic dye is degraded by the UV light.

To prevent the degradation, a filter for blocking UV light and transmitting visible light is preferably provided on the outside of the third liquid crystal layer at the largest distance from the lower substrate. This prevents the dichroic dye from being irradiated with UV light and eliminates the foregoing problem.

(3) In the process of photolithography, the photosensitive polymer material is used to compose the photoresist, which is either positive or negative. To compose the positive resist, a photodegradable polymer material which becomes soluble on exposure to light, such as a novolac resin, is used. To compose the negative resist, a photopolymerizable polymer which is polymerized on exposure to light, such as cyclic polyisoprene, is used.

The present invention has used the foregoing photoresists as the material composing the wall films of the microcapsules and the material composing the binder for binding the microcapsules. In the case of using the negative resist (photopolymerizable polymer material) as the materials of the wall films, binder, and even insulating layers, it is necessary to mask portions in which openings are to be formed such that the other portion having a larger area is exposed to UV light. In this case, however, the dichroic dye composing the liquid crystal layers is also exposed to light, specifically to UV light, which may impair the dichroic dyes.

In the case of using the positive resist (photopolymerizable polymer material) as the materials of the wall films, binder, and insulating layers, it is sufficient to mask the portion other than portions in which openings are to be formed (i.e., the entire liquid crystal layer except for the portions corresponding to the openings) and to expose only the portions in which the openings are to be formed to UV light. Consequently, no degradation occurs in the dichroic dye in the liquid crystal layer so that color performance is not lowered.

From the foregoing, it can be concluded that the positive resist (photodegradable polymer material) is preferably used as the materials of the wall films, binder, and insulating layers in the present invention.

(4) Although Examples 1—1 and 1-2 have shown the embodiments in which the same photodegradable polymer material is used to compose the wall films of the microcapsules, the binder, and the insulating layers, the present invention is not limited thereto. The wall films, binder, and insulating layers may also be composed of a photopolymerizable polymer material or of different photosensitive materials.

Specifically, the wall films, binder, and insulating layers may be composed of the photopolymerizable polymer material in the case where a dichroic dye less likely to be degraded upon exposure to light, such as UV light, is used, where a photopolymerizable polymer material that can be polymerized on exposure to light energy lower than energy sufficient to degrade the dichroic dye is used, or where a photopolymerizable polymer material that can be polymerized on exposure to visible light is used. This is because the display performance is not degraded upon exposure to light. The same shall apply to Example 1-3.

(5) In Examples 1—1, 1-2, and 1-3, the microcapsules having therein the guest-host liquid crystals containing the cyan, magenta, and yellow dichroic dyes or the polymer dispersed liquid crystals have been prepared so that the three liquid crystal layers using the microcapsules or polymer dispersed liquid crystals are laminated to constitute the liquid crystal display devices. In the constitution, the liquid crystal layer at the largest distance from the lower substrate having the driving elements preferably contains the yellow dichroic dye for the following reason.

Figure 3:
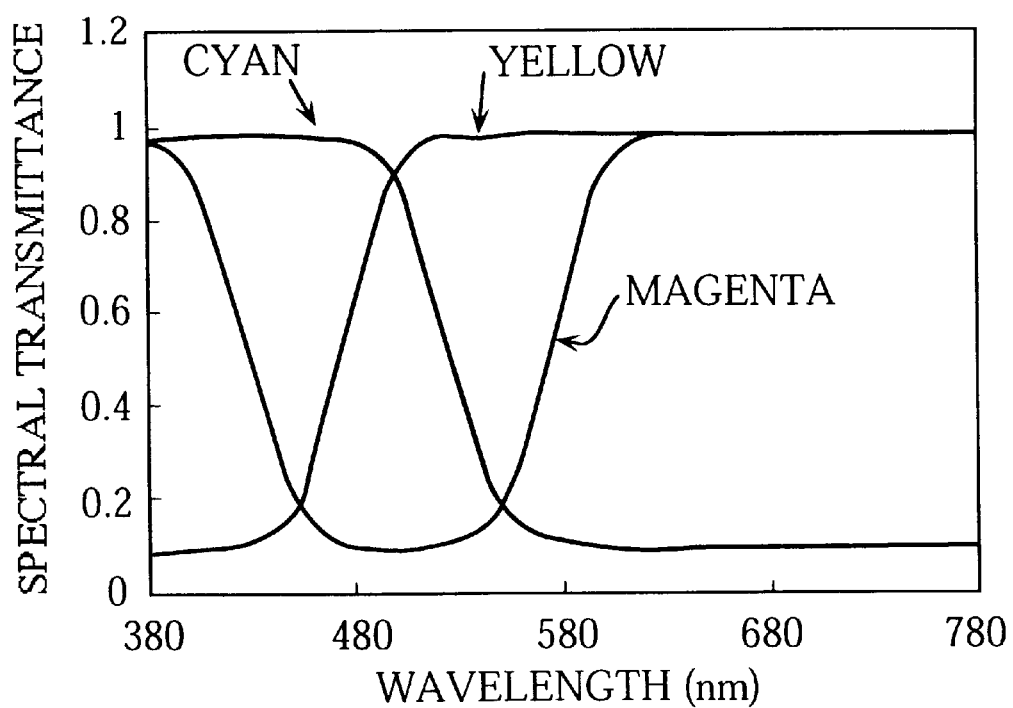
FIG. 3 shows characteristic curves of respective spectral transmittances of cyan, magenta, and yellow dichroic dyes.

FIG. 3 shows characteristic curves of respective spectral transmittances of the cyan, magenta, and yellow dichroic dyes. As can be seen from FIG. 3, the cyan and magenta dyes have high transmittances in the range of shorter wavelengths of 500 nm or less. On the other hand, the yellow dye has lower transmittance in the range of shorter wavelengths and a property of absorbing light of shorter wavelengths.

In the case of using the guest-host liquid crystal containing the cyan or magenta dye, therefore, the dichroic dye absorbs only a small amount of UV light so that the UV light used to irradiate the liquid crystals reaches not only a surface layer but a portion at depths. In the case of using the guest-host liquid crystal containing the yellow dye, however, the yellow dichroic dye absorbs a larger amount of UV light so that the UV light does not reach a portion at depths. Consequently, it becomes difficult to form an opening in the liquid crystal layer having the liquid crystal containing the yellow dye.

However, if the liquid crystal layer containing the yellow dye is positioned at the largest distance from the lower substrate, the foregoing difficulty can be avoided since the liquid crystal layer positioned at the largest distance from the lower substrate does not require an opening.

Although only the portion to be formed with the opening is masked and exposed to UV light when the wall films of the microcapsules and the binder are composed of the photopolymerizable polymer material, another problem also occurs in this case since the portion of the liquid crystal layer not to be formed with an opening may also be washed away during development because of insufficient polymerization at the depths of the liquid crystal layer.

(6) Although Examples 1—1, 1-2, and 1-3 have used the liquid crystal display devices each composed of three layers containing different dichroic dyes to provide full-color display, the present invention is not limited thereto. A liquid crystal display device composed of two liquid crystal layers may also be used.

Although Examples 1—1, 1-2, and 1-3 have used the guest-host liquid crystals each composed of the liquid crystal mixed with the dichroic dye, the present invention can also adopt a system using a chiral nematic liquid crystal which selectively reflects visible light of specified wavelengths. Specifically, a liquid crystal display device is fabricated by selecting a chiral nematic liquid crystal selectively reflecting visible light of specified wavelengths, producing microcapsules using the selected liquid crystal as the core substance or producing a polymer dispersed liquid crystal containing the selected liquid crystal in droplets, and fabricating the liquid crystal display device in the same manner as used in the foregoing embodiments, thereby achieving the foregoing effects of the present invention.

(7) Although Examples 1—1 to 1-3 have composed the wall films of the microcapsules, the binder, or the insulating layers of the photosensitive polymer material, specifically the photodegradable polymer material, it is also possible to compose only the binder of the photosensitive polymer material and compose the wall films of the microcapsules of a material other than the photosensitive material, such as polyvinyl alcohol.

However, if the wall films are composed of a material other than the photosensitive polymer material, the material composing the wall films cannot be dissolved and removed by a photolithographic technique using light such as UV light, so that it becomes difficult to thoroughly remove the microcapsules from a portion of concern by development, which requires considerable labor. In the case where the microcapsules remain in the opening, the connecting line for connecting the pixel electrode and the driving element is not formed satisfactorily. In the case where the microcapsules remain on the liquid crystal layer owing to insufficient washing, color uniformity on the liquid crystal display device is impaired.

Moreover, if the wall films of the microcapsules are composed of the material different from those composing the binder and the insulating layers, irregular reflection is more likely to occur at the interface of the microcapsules so that light loss occurs and brightness is reduced accordingly.

Thus, if the wall films of the microcapsules is composed of the material other than the photosensitive polymer material, manufacturability in the assembly process for the liquid crystal display device and display performance are reduced.

As described above in detail, with the structure of the liquid crystal display device and the manufacturing method therefor according to the present invention, electrical connection is provided between the pixel electrodes and the corresponding driving elements on the glass substrate through the liquid crystal layers interposed therebetween. Hence, it is no more necessary to provide the glass substrate between the liquid crystal layers as has been required by a conventional color liquid crystal display. The present invention provides color liquid crystal display free from color displacement experienced when viewed obliquely.

The present invention also provides a compact liquid crystal display device light in weight, since an Increase in the thickness or weight of a cell resulting from stacked substrates is limited.

Furthermore, the present invention simplifies the process of manufacturing the liquid crystal display device. In particular, the provision of the insulating layer prevents a short circuit between the pixel electrodes resulting from a pinhole formed in the liquid crystal layer and a discontinuity in the connecting line resulting from a projecting or depressed portion in the surface of the liquid crystal layer, while providing connection between the pixel electrodes and the corresponding driving elements on the substrate through the liquid crystal layers interposed therebetween. Hence, there can be implemented the liquid crystal display device excellent in brightness with minimum light loss and faulty operation.

Examples in Second Mode of Invention

Next, liquid crystal display devices according to embodiments of the present invention in the second mode will be described. Since the following embodiments are primarily for elucidating the art disclosed by the present invention, the present invention in the second mode is not limited to the specific embodiments, similarly to the present invention in the first mode.

EXAMPLE 2-1

Figure 8:
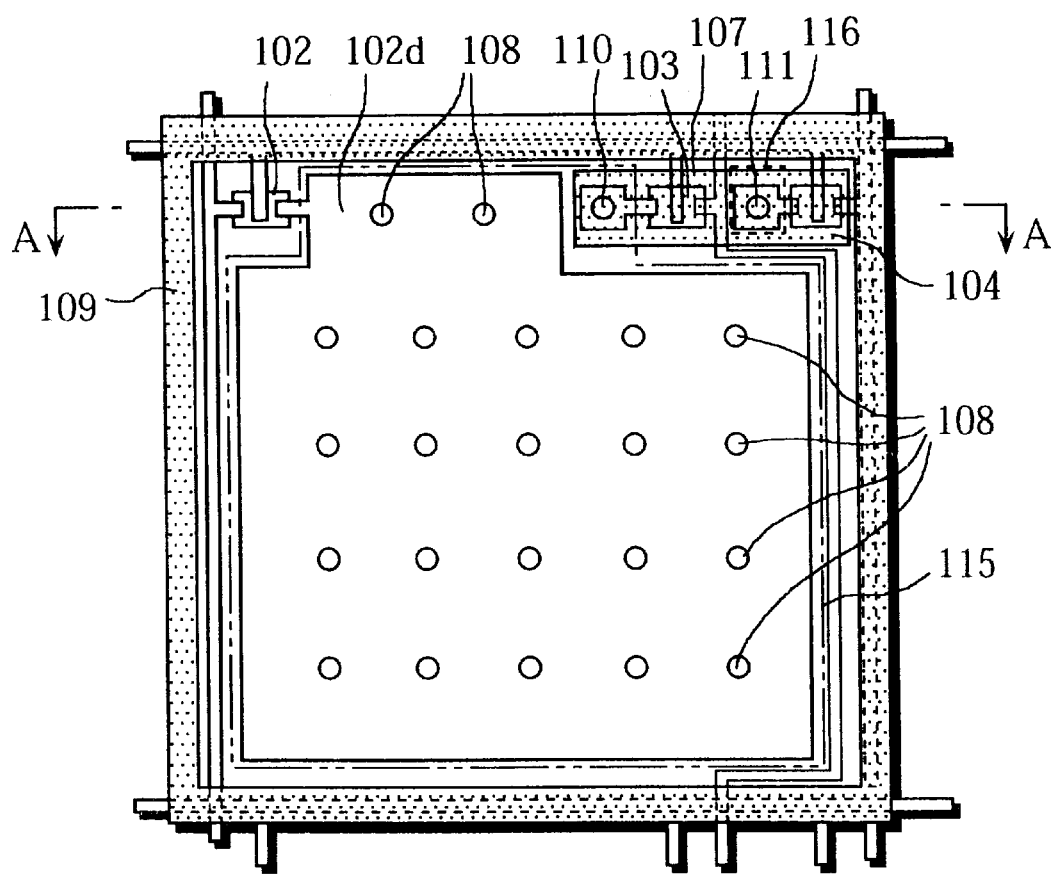
FIG. 8 is a plan view of a liquid crystal display device according to Example 2-1 of the present invention in a second mode.
Figure 9:
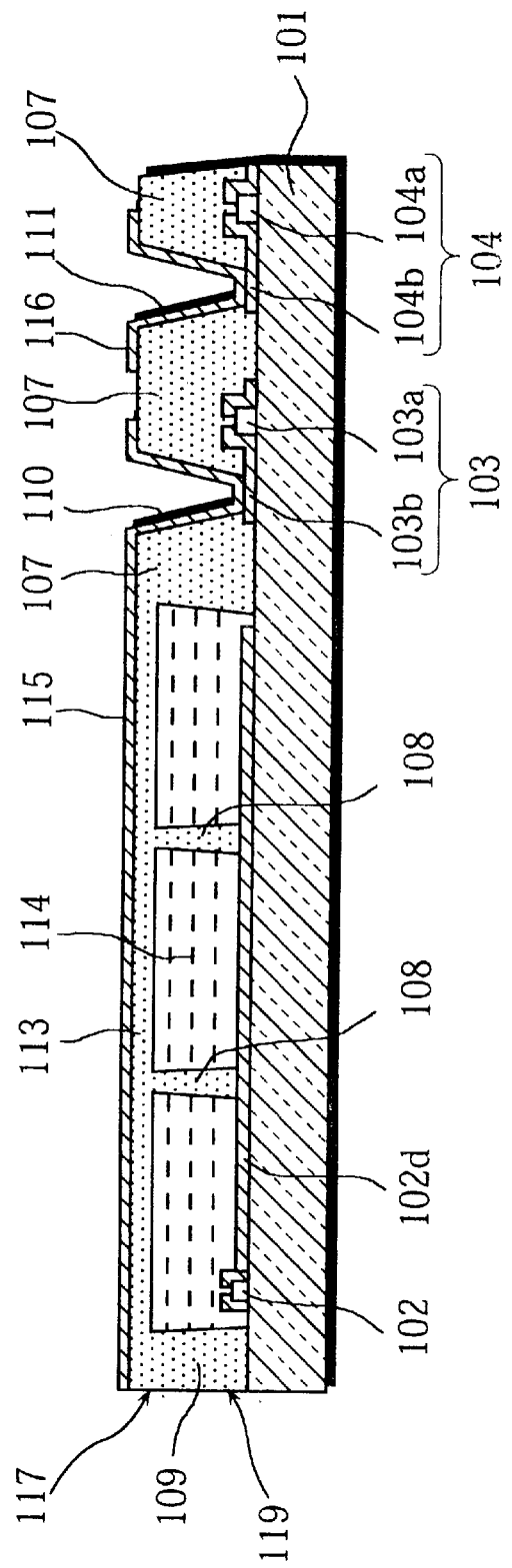
FIG. 9 is a cross-sectional view of the liquid crystal display device according to Example 2-1 taken along the arrow A—A in FIG. 8.
Figure 10:
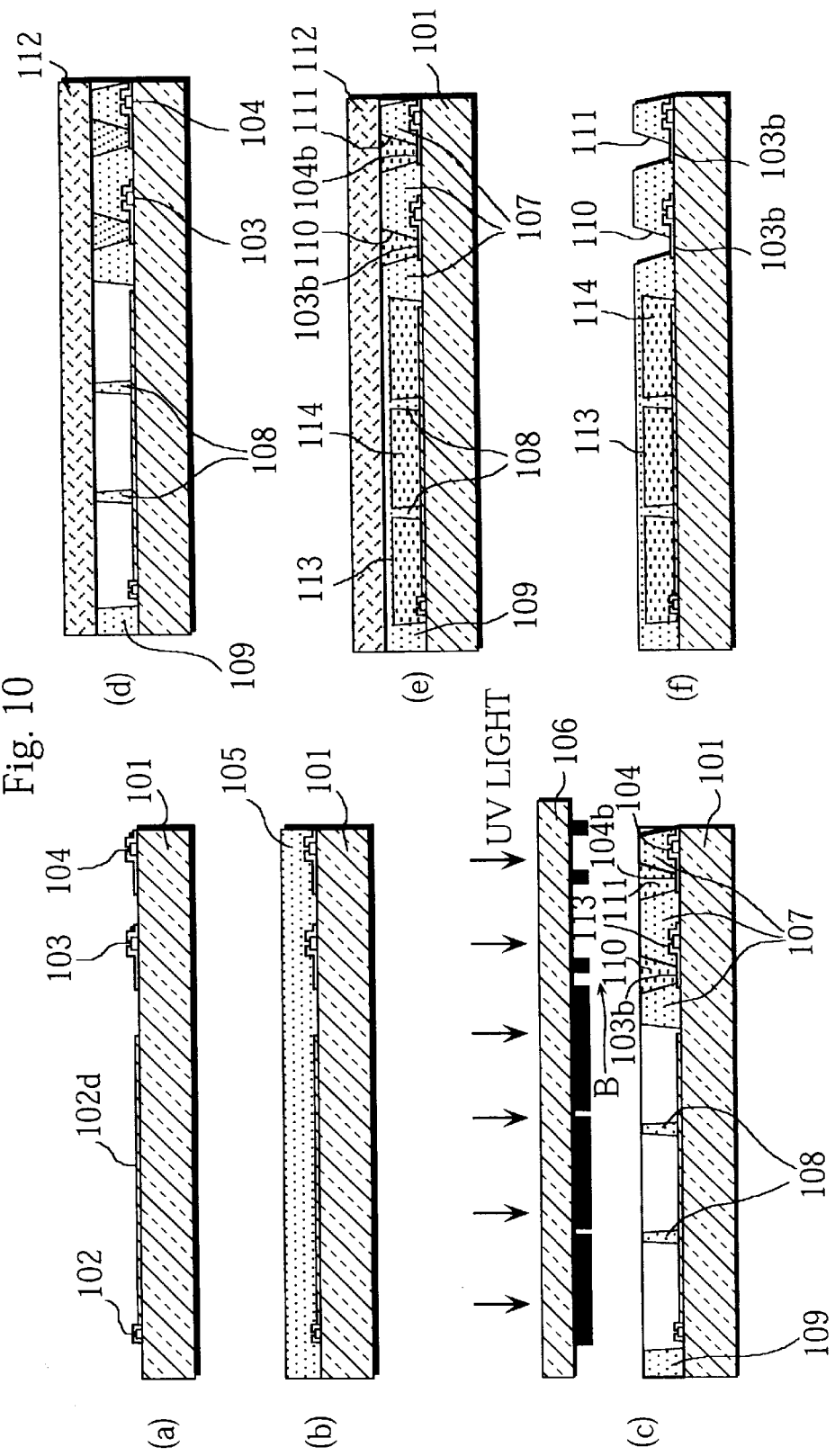
FIGS. 10(a)–10(f) are cross-sectional views illustrating a method of manufacturing the liquid crystal display device according to Example 2-1.
Figure 11:
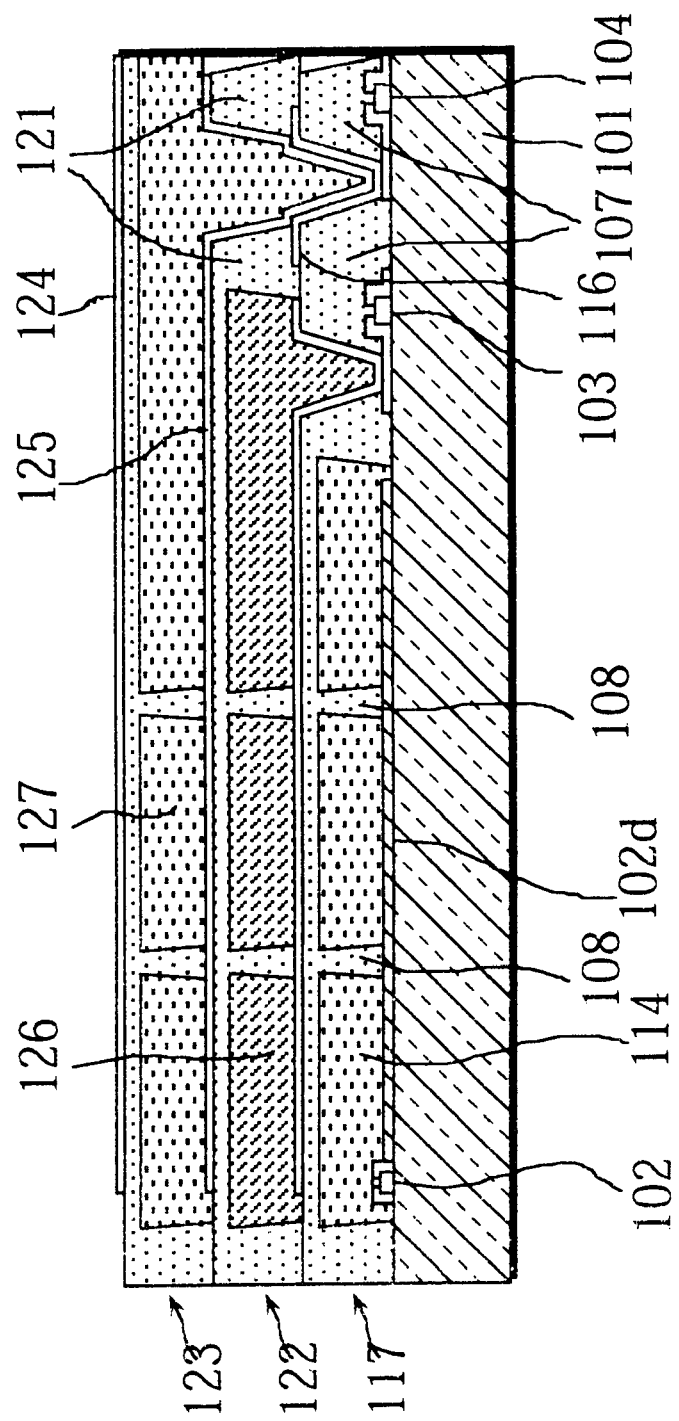
FIG. 11 is a cross-sectional view of the tri-layered liquid crystal display device according to Example 2-1.

Referring now to FIGS. 8 to 11, a liquid crystal display device according to Example 2-1 of the present invention in the second mode will be described. FIG. 8 is a plan view of the liquid crystal display device of the present invention. FIG. 9 is a cross-sectional view taken along the arrow A—A in FIG. 8. FIG. 10 is a cross-sectional view illustrating a manufacturing process for the liquid crystal display device. FIG. 11 is a cross-sectional view of a tri-layered liquid crystal display device of the present invention.

As shown in FIGS. 8 and 9, thin film transistors (hereinafter referred to as TFT elements) 102, 103, and 104 made of a-Si (amorphous silicon) are formed on a substrate 101 made of borosilicate glass. The TFT elements 103 and 104 have respective main body portions 103a and 104a and respective drain terminals (output terminals) 103b and 104b. The TFT elements 102 has a drain terminal also serving as a reflector electrode 102d. A first liquid crystal layer 114 is formed on the reflector electrode 102d. The first liquid crystal layer 114 is composed of a guest-host liquid crystal containing a cyan dichroic dye dissolved in a proportion of 2 wt % in a fluorine-based nematic liquid crystal having a twist pitch adjusted to be 4.3 $\mu$m (with $\Delta$n of 0.065) with the addition of a small amount of chiral agent. A sealing plate 113 (with a thickness of about 1 $\mu$m) is provided on the first liquid crystal layer 114 to seal the liquid crystal in the first liquid crystal layer 114. The sealing plate 113 is made of a polymer of the same composition (specifically, an acrylic polymer) as composing spacers 108, a partition wall 109, and multi-level interconnect pads 107, which will be described later, and is integrally formed with these components.

The entire surfaces of the main body portions 103a and 104a of the TFT elements 103 and 104 are covered with the corresponding multi-level interconnect pads 107, while the surfaces of the drain terminals 103b and 104b are partially covered therewith. Between the multi-level interconnect pads 107, there are formed openings 110 and 111 (each having a diameter of 4 $\mu$m) for multi-level interconnection. The drain terminals 103b and 104b of the TFT elements 103 and 104 are partially exposed at the bottom portions of the openings 110 and 111. The partition wall 109 is formed on the substrate 101 to enclose a pixel. In the pixel, the columnar spacers 108 (each having a diameter of 3 $\mu$m) are regularly distributed with a pitch of 20 $\mu$m. The spacers 108, the multilevel interconnect pads 107, and the partition wall 109 constitute a support member 119 for the sealing plate 113. Transparent electrodes 115 and 116 are further formed over the sealing plate 113 and the multi-level interconnect pads 107 including the openings 110 and 111. The transparent electrode 115, the first liquid crystal layer 114, the support member 119, and the sealing plate 113 constitute a first display layer 117.

As shown in FIG. 11, a second display layer 122 and a third display layer 123 having substantially the same structure as the first display layer 117 are also provided on the first display layer 117. The second display layer 122 is different from the first display layer 117 in that a magenta dichroic dye is used in the second liquid crystal layer 126 and that multi-level interconnect pads 121 are provided on the surfaces of the multi-level interconnect pads 107 on the TFT element 104 and of the transparent electrode 116. The third display layer 123 is different from the first display layer 117 in that a yellow dichroic dye is used in the third liquid crystal layer 127 and that no multi-level interconnect pad is provided therein.

Although the present embodiment has used the sealing plate 113 having a thickness of 1 $\mu$m, consideration will be given to the range of its thickness that allows improvements in the performance of the liquid crystal display device by taking the first display layer 117 as an example.

Since the voltage applied to the first display layer 114 is increased as the sealing plate 113 is thinner, the drive voltage for the TFT elements can be reduced accordingly. In terms of reducing the drive voltage, therefore, it is desirable to minimize the thickness of the sealing plate 113. However, if the sealing plate 113 is excessively thin, it may be deformed during the formation of the transparent electrode 115, resulting in a wrinkle or a crack. Specifically, even when the transparent electrode 115 was formed at room temperature, a wrinkle was recognized at the sealing plate 113 having a thickness less than 0.5 $\mu$m. Hence, the thickness of the sealing plate 113 is preferably controlled to be 0.5 $\mu$m or more.

If the sealing plate 113 is sufficiently thick, on the other hand, the density of the spacers 108 can be lowered. However, the voltage applied to the first liquid crystal layer 114 is reduced and thy diameters of the openings 110 and 111 for multi-level interconnection are increased, resulting in a lower aperture ratio (the ratio of the area occupied by a pixel electrode to the entire area). Since it is difficult to apply a drive voltage of 10 V or higher to the TFT elements 102, 103, and 104 if their voltage resistance is considered and a minimum of 5 V is required as the ON-state voltage for the liquid crystal, the voltage applied to the first liquid crystal layer 114 should be ½ or more of the drive voltage for the TFT elements 102, 103, and 104. In this case, since the dielectric constant of the sealing plate 113 composed of the polymer is roughly on the same order as that of the liquid crystal, it is required to adjust the thickness of the sealing plate 113 to be equal to or less than that of the first liquid crystal layer 114 if the a voltage of ½ or more of the drive voltage for the TFT elements 102, 103, and 104 is to be applied to the liquid crystal. In-terms of response speed, the thickness of the first liquid crystal layer 114 is preferably 10 $\mu$m or less. Accordingly, the thickness of the sealing plate 113 is preferably controlled to be 10 $\mu$m or less. In this case, it was confirmed that, even with a pixel pitch as small as about 100 $\mu$m, a reduction in aperture ratio was several percent or less, which had only a slight influence.

Hence, it is desirable to control the thickness of the sealing plate 113 to be 0.5 to 10 $\mu$m.

A method of manufacturing the liquid crystal display device thus constituted will be described.

First, as shown in FIG. 10(a), the TFT elements 102, 103, and 104 made of a-Si were formed on the substrate 101 made of borosilicate glass. Next, as shown in FIG. 10(b), the guest-host liquid crystal prepared by dissolving 2 wt % of the cyan dichroic dye in a fluorine-based nematic liquid crystal having a twist pitch adjusted to be 4.3 $\mu$m (with $\Delta$n of 0.065) with the addition of a small amount of chiral agent was mixed with a photosensitive acrylic resin (polymer precursor) commercially available from Sumitomo 3M Ltd.

at a ratio of 2:1 to prepare a solution mixture in a miscible state. The solution mixture was applied onto the substrate 101 by using a roll coater, thereby forming a film 105 of the solution mixture (with a thickness of 4.0 $\mu$m). The photosensitive acrylic resin is transparent and cured by UV light, heat, or a catalyst.

Next, as shown in FIG. 10(c), the substrate formed with the film 105 of the solution mixture was exposed to UV light through a mask 106 in a nitrogen atmosphere by means of a stepper, so that the acrylic resin in the exposed portion of the film of the solution mixture was polymerized. In the polymerization process, the multi-level interconnect pads 107, the openings 110 and 111 formed in the multi-level interconnect pads 107, the partition wall 109, and the spacers 108 were formed. The portion polymerized in the polymerization process corresponds to the dotted portion in FIG. 8. When the acrylic resin was polymerized on exposure to the UV light in the polymerization process, the acrylic resin in the solution mixture was caused to move in the solution by diffusion. Consequently, the acrylic resin in the solution mixture overlying the drain terminals 103b and 104b contained in the multi-level interconnect pads 7 was consumed by polymerization, while the supply of the resin was blocked by the multi-level interconnect pads 107 (i.e., the resin did not move in the direction indicated by the arrow B). As a result, the solution mixture in the openings 110 and 11 was changed into a nematic liquid crystal phase.

Next, as shown in FIG. 10(d), a solution was prepared by dissolving 5 wt % of amine-base activator for the acrylic resin in a solvent mixture of pure water and isopropyl alcohol at a volume ratio of 10:1. The solution was applied dropwise from a dropping pipet onto the film 105 of the solution mixture to form a film 112, which was allowed to stand for 180 seconds. As a consequence, the acrylic resin was polymerized on the surface of the solution mixture, resulting in the sealing plate 113 composed of a film of the acrylic polymer as shown in FIG. 10(e). The sealing plate 113 had the same composition as the spacers 108, the partition wall 109, and the multi-level interconnect pads 107 polymerized in the film and was integrally formed with the components.

Since pure water which was not miscible with the solution mixture had been used as the main solvent for the activator, the state in which the two types of solutions are separate was maintained. The activator was supplied from the surface of the film so that polymerization proceeded from the surface. Although a small amount of isopropyl alcohol had been added to water to improve wettability, the solvent is not limited to pure water provided that the solvent is not readily miscible with the solution mixture.

In the polymerization process, extremely thin coatings were deposited over the openings 110 and 111 but broken when washed with pure water. Consequently, no film was left on the drain terminals 103b and 104b located in the openings 110 and 111, as shown in FIG. 10(f). On the other hand, since the acrylic resin in the solution mixture had been consumed at the formation of the sealing plate 113, only the guest-host liquid mostly was present between the sealing plate 113 and the reflector electrode 102d. Consequently, the first liquid crystal layer 114 presenting twisted nematic alignment in horizontal orientation was formed between the sealing plate 113 and the reflector electrodes 102d. Although the orientation is not uniform, a twist of about 250° was considered to be present since the thickness of the first liquid crystal layer 114 is 3 $\mu$m, while a deep cyan color was observed.

Thereafter, the substrate 101 was dried at 105° C. and a film of indium tin oxide (ITO) is formed thereon by sputtering with the substrate 101 heated at 120° C. The ITO film was then patterned by a photolithographic technique and by an etching technique using ferric chloride to form the transparent electrode 115 indicated by the dashed line in FIG. 8. The transparent electrode 115 was to serve as a second pixel electrode opposing the reflector electrode 102d and connected to the drain terminal 103b of the TFT element 103 through the opening 110. It was confirmed that the liquid crystal responded to an output potential difference between the TFT elements 102 and 103 and that the color faded out with the application of voltage.

By repeating the foregoing process, the three liquid crystal layers containing the three dichroic dyes of cyan, magenta, and yellow were laminated between the electrodes and the polymer films. FIG. 11 is a cross-sectional view of the liquid crystal display device of the present invention thus fabricated.

Specifically, the second liquid crystal layer 126 of magenta was formed by the same process as used to fabricate the first liquid crystal layer 114 except that the magenta dichroic dye was used in the second liquid crystal layer 126 and that the multi-level interconnect pads 121 were provided on the multi-level interconnect pads 107 and on the transparent electrode 116, which were located above the drain of the TFT element 104 formed in the liquid crystal layer 114 of cyan, followed by a transparent electrode 125 provided atop the second liquid crystal layer 126. The third liquid crystal layer 127 having therein the guest-host liquid crystal containing the yellow dichroic dye was also formed by the same process. In forming the third liquid crystal layer 127, however, a multi-level interconnection is not required since a voltage is applied between a common electrode 124 composed of ITO and the transparent electrode 125 connected to the TFT element 104. Accordingly, the third liquid crystal layer 127 may also be formed by a normal process using a glass counter substrate.

The liquid crystal layers 114, 126, and 127 were driven by the respective transistors and it was confirmed that reflection color liquid crystal display with no parallax was achieved.

Since the liquid crystal display device of the present invention is thus fabricated by applying the solution mixture containing the liquid crystal and the polymer precursor onto the substrate, causing polymerization by using the activator under the UV light, and forming the electrode thereon, it becomes possible to fabricate the liquid crystal display device by a process simpler than used conventionally. Moreover, the liquid crystal layer can be formed on the substrate without using the counter glass substrate. Furthermore, the liquid crystal can be sealed between the substrate and the sealing plate.

The spacers formed by the step of polymerizing the polymer precursor in the film by subjecting specified portions to UV exposure are provided to support the sealing plate and the counter electrode because the sealing plate on the surface has a reduced thickness of 1.0 $\mu$m. However, since the spacer pitch is 20 $\mu$m and the diameter of the spacer is 3 $\mu$m, the probability of the liquid crystal being present on the pixel electrode (or effective aperture ratio) is about 98%, which is by far higher than an effective aperture ratio obtained in accordance with the conventional method in which the liquid crystal is held in capsules. Preferably, the spacer pitch is 50 $\mu$m or less to prevent deformation of the sealing plate which occurs when the spacer pitch is 50 $\mu$m or more.

Although the present embodiment has caused polymerization of the acrylic resin in the film prior to polymerization of the acrylic resin at the film surface with a view to preventing deposition of coatings over the openings for multi-level interconnections, it is also possible to polymerize the acrylic resin at the film surface first and then polymerize the acrylic resin in the film by exposing a specified portion to light. In this case, however, thick coatings are deposited over the openings for multi-level interconnections so that an extra step of removing the coatings afterwards becomes necessary.

Although the present embodiment has used the amine-based activator to cause polymerization at the surface of the film of the solution mixture, a similar effect is achieved by another substance provided that it can be dissolved in a solvent not miscible with the solution mixture. However, an amphophilic substance such as amine is preferably used since it is diffused into the liquid crystal to control the thickness of the coating.

Polymerization at the film surface may also be caused by a method in which a hot wind is allowed to flow along the film surface or by a method in which the substrate surface is exposed to a polymerization promoting agent that has been gasified. The material for promoting polymerization is not limited to the activator mentioned above but a polymerization initiator or a monomer necessary for a reaction and forming a reaction product may also be used.

Although the present embodiment has caused polymerization at the surface by applying the solution of the activator and allowing the applied solution to stand, the polymerization at the surface is not limited to such a method. For example, polymerization can be initiated at the surface by applying, at the stage shown in FIG. 10(e), a reaction promoting substance such as a polymerization initiator onto the solution mixture and exposing, to UV light, the whole substrate or the portion thereof other than the portions corresponding to the openings for polymerization. If polarized UV light is used in this case, a degree of polymerization in the polymer presents anisotropy in the direction of polarization, so that it is possible to align the liquid crystal on the polymer. Although the liquid crystal used in the present embodiment has presented the twisted alignment in the amorphous state, the liquid crystal in such alignment can slightly improve the contrast ratio.

Although the present embodiment has provided the reflector film on the substrate, the structure of the liquid crystal display device is not limited thereto. For example, the electrode on the substrate may be composed of a transparent electrode and the reflector film may be formed on the outermost surface of the liquid crystal layer.

In the liquid crystal display device of the present invention, the concentration of the cyan dichroic dye was controlled to be 2%, while the concentrations of the magenta and yellow dichroic dyes were controlled such that most achromatic black was displayed on the application of voltage. Specifically, cells (with a cell gap of 3 $\mu$m) with the guest-host liquid crystals for the respective colors were produced. Next, by using data obtained by measuring the absorption spectra of the individual liquid crystals by spectrophotometry, chromaticity coordinates obtained when the three layers were stacked were calculated by adding up the individual absorption spectra in consideration of the fact that the absorbance is directly proportional to the concentration. According to the chromaticity coordinates, the most achromatic black can theoretically obtained when the magenta and yellow dichroic dyes are added to the liquid crystals at the concentrations of 3.0% and 2.4%, respectively. With the actual three stacked cells, however, the colors in the upper liquid crystal layers were the deeper so that black with a yellow-greenish tint was perceived since the liquid crystal layers containing the yellow, magenta, and cyan dichromic dyes were positioned in descending order from the top surface. To lessen the yellow-greenish tint, sixteen panels were produced by reducing the concentrations of the yellow and magenta dyes from the foregoing values in decrements of 0.04%, with the result that the most achromatic black was obtained when the yellow and magenta dyes were added at the concentrations of 2.28% and 2.96%, respectively, which correspond to the values obtained by reducing 5% and 1.3% from the foregoing theoretical concentrations of the yellow and magenta dyes. Similar experiments were performed by vertically repositioning the liquid crystal layers in different orders and it was also confirmed that the perceived color was more achromatic when the concentration of the dye in the liquid crystal layer at the largest distance from the substrate was reduced to a greater extent. To improve the display performance of the liquid crystal display device, therefore, the foregoing adjustment is preferably performed. In the case of displaying white, the color perceived is also tinted with the colors of the liquid crystal layers at the larger distances from the substrate, though they are less conspicuous. Hence, it is also desirable to similarly control the concentrations of the dichroic dyes and the absorbances of the individual liquid crystals in the case of displaying white.

EXAMPLE 2—2

In Example 2-1 of the present invention, the liquid crystal display device composed of the three liquid crystal layers containing the respective dichroic dyes of cyan (C), magenta (M), and yellow (Y) has used the spacers formed of the transparent acrylic resin. However, the spacers have formed luminescent spots which are slightly conspicuous in displaying black with no voltage applied. To make the luminescent spots less conspicuous, pigments of the same colors as the dichroic dyes contained in the respective liquid crystals were dispersed in respective acrylic resins to be mixed with the liquid crystals. The resulting acrylic resins with the different-colored pigments dispersed therein were used to form three stacked liquid crystal layers of the three colors of CMY in accordance with the same method as used in Example 2-1.

As a result, no luminescent spot was observed in the case of displaying black. In the case of displaying white, the spacers slightly tinted with the colors of CMY were observed, but they were less conspicuous. In the case of displaying the other colors, the spacers in the liquid crystal layers highly absorptive with a low applied voltage were substantially unseen. In the case of displaying green, e.g., the liquid crystal layer of magenta was less absorptive and the liquid crystals of cyan and yellow were more absorptive, so that only the magenta spacers were observed, while the spacers of the other colors were unseen.

To reduce the luminescent spots during black display, some conventional transmission-type liquid crystal display devices have used black spacers. In that case, however, the spacers constantly form black points. By contrast, the use of the colored spacers as mentioned above achieves a considerable reduction in an average number of conspicuous spacers. It will be appreciated that a similar effect is obtained even in a liquid crystal display device composed of three stacked panels of glass substrates provided that the colors of the spacers are coincident with the colors of the dichroic dyes.

In the case of additive color mixing using a color filter, a difficult process of changing the colors of the spacers from one place to another is necessary, s0 that it is difficult to use the aforesaid technique of using the colored spacers. However, the aforesaid technique can easily be applied to a multi-layer liquid crystal panel and exerts a great effect since a large number of spacers in total are provided.

EXAMPLE 2-3

Initially, a liquid crystal display device manufactured in accordance with a manufacturing method according to Example 2-3 of the present invention will be described.

Figure 12:
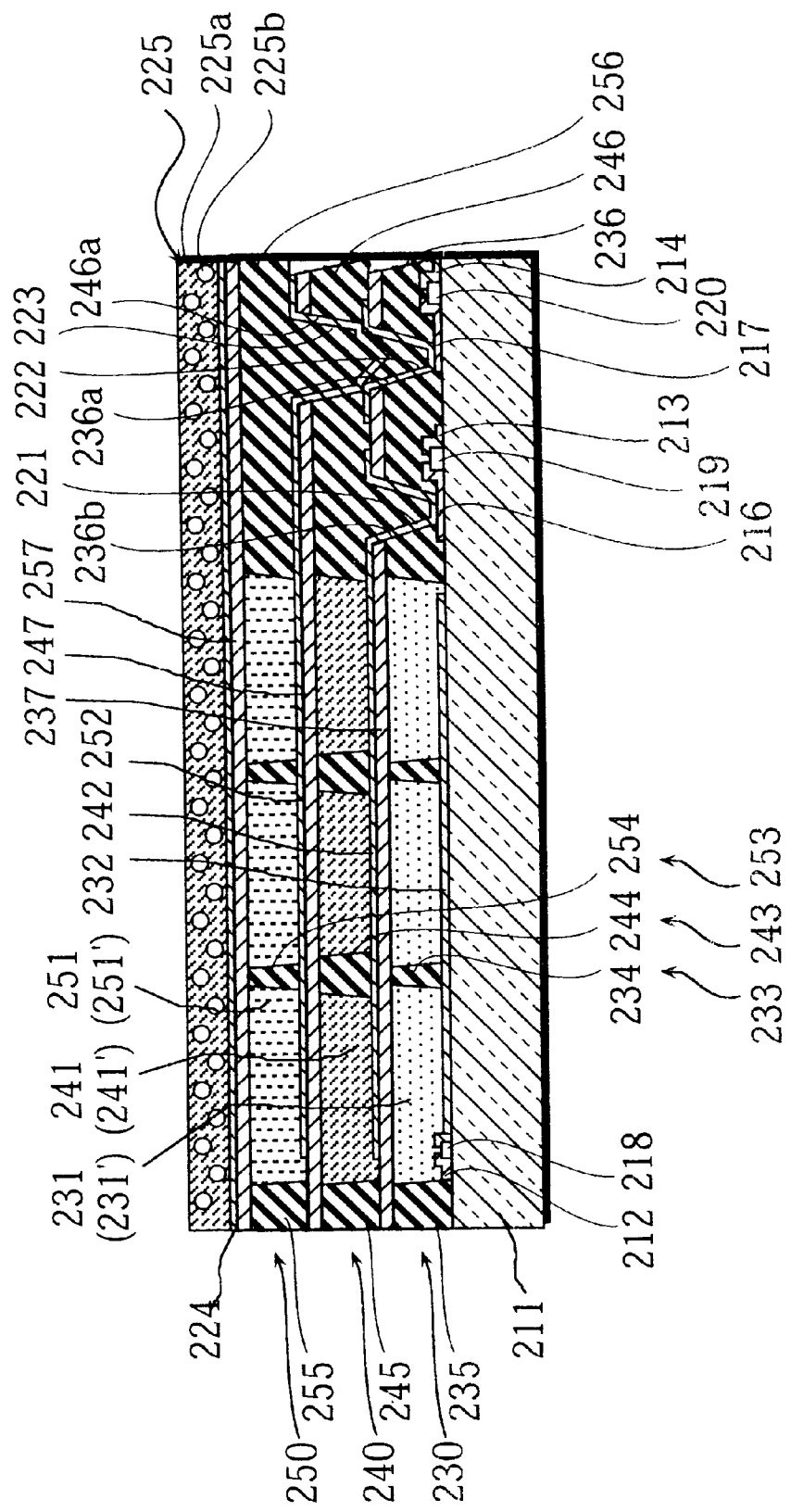
FIG. 12 is a cross-sectional view showing the structure of one pixel of a liquid crystal display device according to Example 2-3 of the present invention in the second mode.

FIG. 12 is a cross-sectional view showing the structure of one pixel in the liquid crystal display device.

Figure 13:
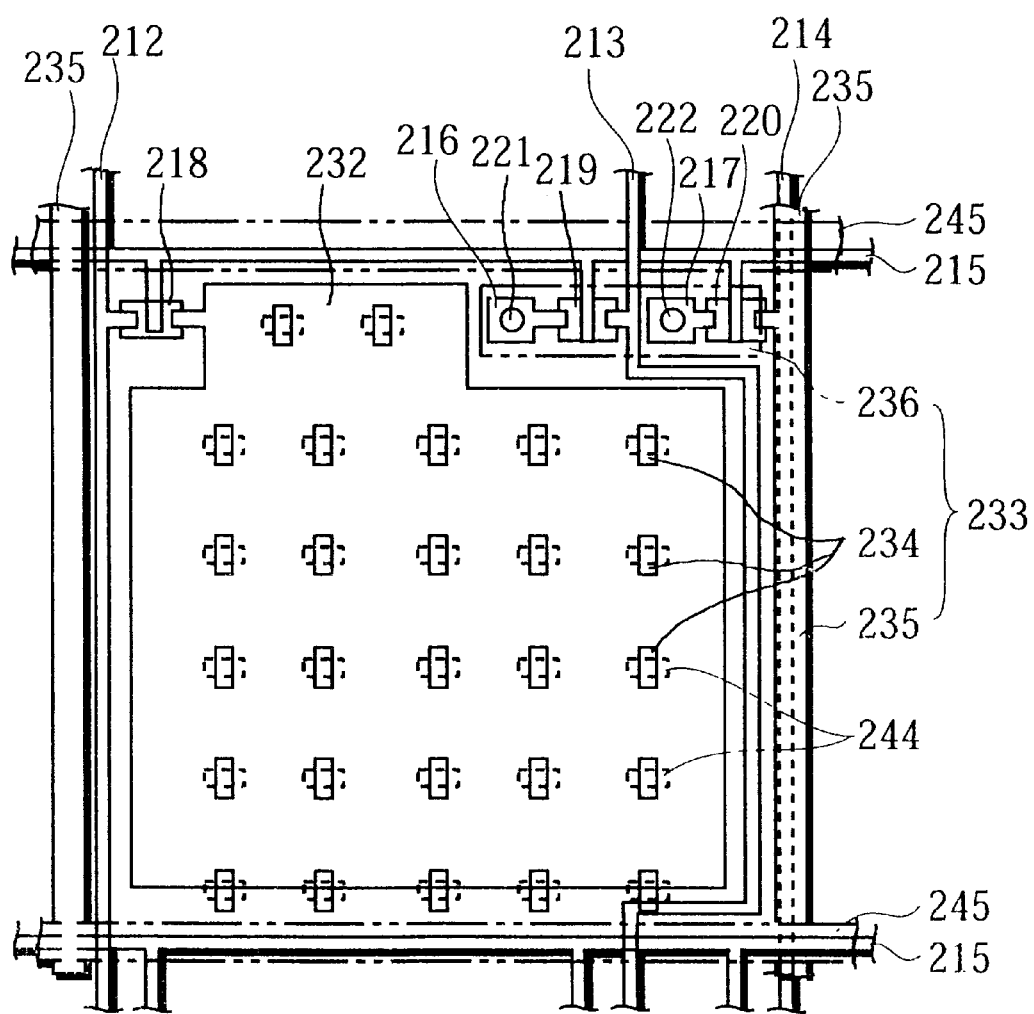
FIG. 13 is a plan view showing the structure of one pixel of the liquid crystal display device according to Example 2-3.

FIG. 13 is a plan view showing the structure of one pixel in the liquid crystal display device.

Figure 14:
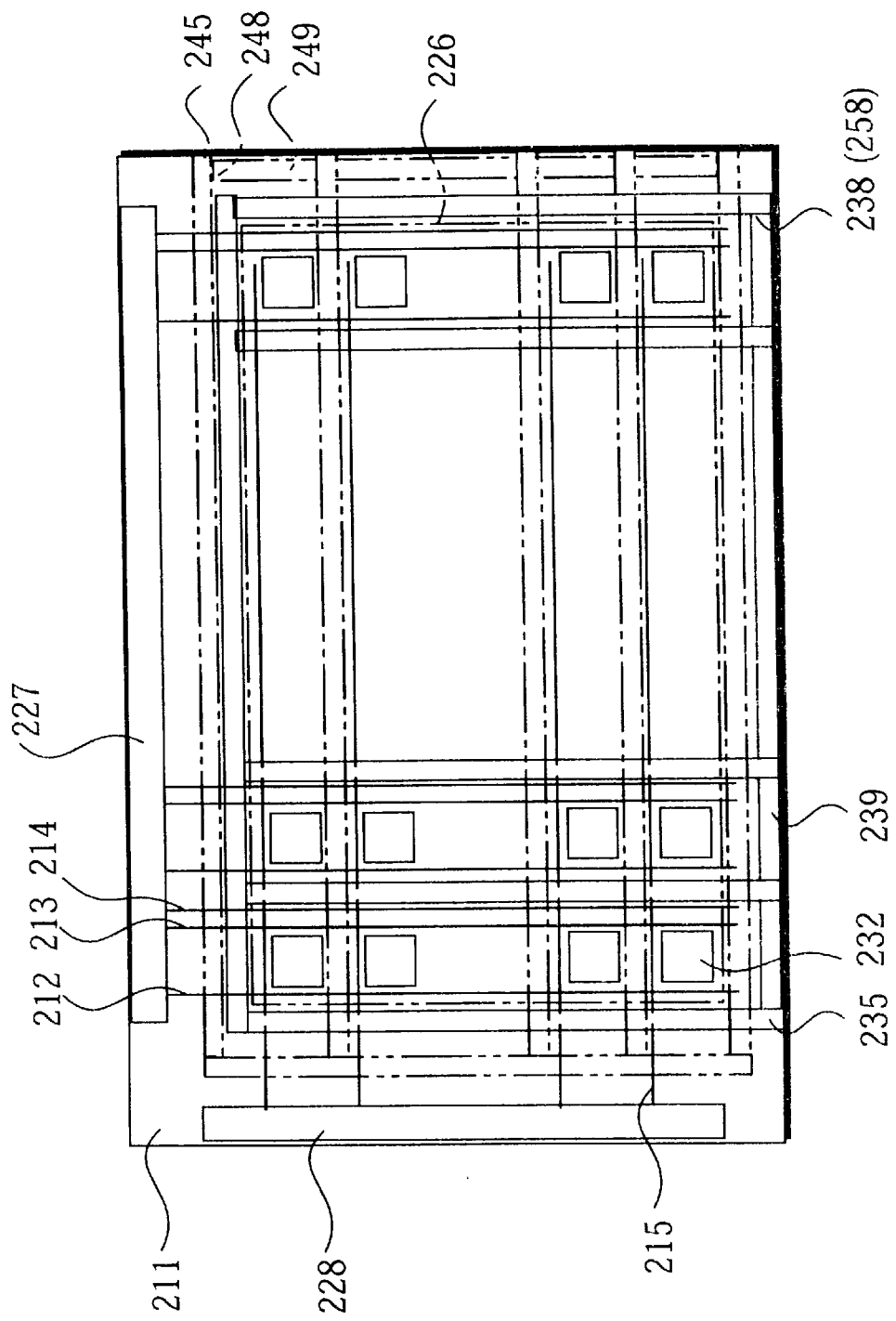
FIG. 14 is a plan view showing the overall structure of the liquid crystal display device according to Example 2-3.

FIG. 14 is a plan view showing the overall structure of the liquid crystal display device.

Although the liquid crystal display device has been formed to have, e.g., a diagonal length of 5 cm and a pixel pitch of 0.3 mm, It is shown enlarged, reduced, or diagrammatized in the individual drawings as necessary.

As shown in FIG. 12, the liquid crystal display device is composed of three liquid crystal layers 230, 240, and 250 filled with respective guest-host liquid crystals 231, 241, and 251 of cyan, magenta, and yellow and formed on a glass substrate 211.

As shown in FIG. 13, the glass substrate 211 is formed with source lines 212 to 214, a gate line 215, a pixel electrode 232 also serving as a reflector film, and link electrodes 216 and 217, each made of, e.g., aluminum. The glass substrate 211 is further provided with TFTs (Thin Film Transistors) 218 to 220 connected to the source lines 212 to 214 and to the gate line 215 and with driver circuits 227 and 228 disposed in the peripheral portion of an image display area 226 to apply a drive voltage to the source lines 212 to 214 and to the gate line 215, as shown in FIG. 14.

The guest-host liquid crystals 231, 241, and 251 are composed of chiral nematic liquid crystals prepared by adding a chiral agent for providing a twist pitch of 4.3 $\mu$m to a mixture of a fluorine-based P-type nematic liquid crystal as a host and cyan, magenta, and yellow dichroic dyes as guests dissolved in the fluorine-based P-type nematic liquid crystal. Cyan, Magenta, and yellow are three primary colors for subtractive color mixing. Each of the guest-host liquid crystals 231, 241, and 251 exhibits parallel alignment which is twisted about 250° in an amorphous state. In the absence of applied voltage, red, green, or blue light is absorbed so that the color of the guest is displayed. In the presence of applied voltage, the amount of absorbed light is reduced and the liquid crystals become substantially transparent so that white is displayed.

More specifically, the liquid crystal layer 230 is composed of the guest-host liquid crystal 231 of cyan filled in a gap 231' between the glass substrate 211 and the sealing film 237 supported by the support member 233. The height of the support member 233 or the thickness of the guest host liquid crystal 231 is adjusted to be 3 $\mu$m, while the thickness of the sealing film 237 is adjusted to be 1 $\mu$m.

The support member 233 is composed of the dotted spacers 234 provided over the pixel electrode 232, linear spacers 235 mainly provided between the individual pixel electrodes 232, and a multi-level interconnect pad 236 provided over the TFTs 219 and 220.

More specifically, the dotted spacers 234, each formed to have a rectangular transverse cross section of 6×3 $\mu$m, are regularly arranged with a pitch of 30 $\mu$m over the pixel electrode 232. The configuration and arrangement of the dotted pacers 233 prevent variations in the thickness of the guest-host liquid crystal 231 caused by the hanging of the sealing film 237 and constantly provides an effective aperture ratio of 98%. It is to be noted that the area density of the dotted spacers 234 (size and arrangement pitch) are not limited to the foregoing values but can be varied based on the material and thickness of the sealing film 237 so as to allow the lamination of the liquid crystal layers 230, 240, and 250 and provide the effective aperture ratio.

On the other hand, the linear spacers 235, each formed to have a width of 30 $\mu$m, are arranged to extend along the source lines 212 to 214, except for one extending along the edge of the image display area 226 to close the regions filled with the guest-host liquid crystal 231 at the side of the driver circuit 227, as shown in FIG. 14. Openings 238 as injection ports for the guest-host liquid crystal 231 are formed on the other side of the regions to be filled with the guest-host liquid crystal 231, which are sealed with a resin 239 after the injection of the guest-host liquid crystal 231.

The sealing film 237 and the multi-level interconnect pad 236 are formed with tapered openings 236a and 236b each having an average diameter of 6 $\mu$m measured at a vertical midpoint thereof. On the inner surfaces of the openings 236a and 236b, there are formed link electrodes 221 and 222, respectively.

On the sealing film 237, there is formed a pixel electrode 242 composed of a transparent ITO (Indium Tin Oxide). The pixel electrode 242 is connected to the TFT 219 via the link electrode 221 and the link electrode 216 on the glass substrate 211 to be used in common by the liquid crystal layers 230 and 240. Briefly, the pixel electrode 242 is used as the pixel electrode for the liquid crystal layer 240, while it is used as the counter electrode for the liquid crystal layer 230.

The liquid crystal layers 240 and 250 are composed of the respective guest-host liquid crystals 241 and 251 of magenta and yellow filled in respective spaces 241' and 251' between the sealing film 237 and a sealing film 247 and between the sealing film 247 and a sealing film 257, respectively, similarly to the liquid crystal layer 230. The sealing films 247 and 257 are supported by respective support members 243 and 253 composed of dotted spacers 244 and 254, linear spacers 245 and 255, and multi-level interconnect pads 246 and 256.

However, the liquid crystal layers 240 and 250 are different from the liquid crystal layer 230 in the following respects.

Each of the dotted spacers 244 is formed to have a square transverse cross section with lengths orthogonal to those of the dotted spacers 234 and 254 in the liquid crystal layers 230 and 250 such that allowance for the displacement of the dotted spacers 234 and 254 is increased.

The linear spacers 245 are arranged to extend along the gate lines 215, except for one extending along the edge of the image display area 226 to close the regions filled with the guest-host liquid crystal 241 at the side of the driver circuit 228. Openings 248 as injection ports for the guest-host liquid crystal 241 are formed on the other side of the regions to be filled with the guest-host liquid crystal 241, which are sealed with a resin 249 after the injection of the guest-host liquid crystal 241. The arrangement increases allowance for displacement, similarly to the dotted spacers 244.

The multi-level interconnect pad 246 fills up the opening 236b in the sealing film 237 and in the multi-level interconnect pad 236, while an opening 246a having an average diameter of 14 μm measured at a vertical midpoint thereof is formed in the sealing film 247 and in the multi-level interconnect pad 246. On the inner surface of the opening 246a, there is formed a link electrodes 223. The opening 246a is formed to be larger than the opening 236a in the multi-level interconnect pad 236 such that the link electrodes 222 and 223 are surely connected at a flat portion between the openings 236a and 246a.

Although the multi-level interconnect pad 256 fills up the opening 246a in the sealing film 247 and in the multi-level interconnect pad 246, no opening is formed therein.

A pixel electrode 252 formed on the sealing film 247 is connected to the TFT 220 via the link electrodes 223 and 222 and the link electrode 217 on the glass substrate 211. By thus connecting the pixel electrodes 242 and 252 to the corresponding TFTs 219 and 220 via the link electrode 221 and the like, it is sufficient to simply form the TFTs 218 to 220 on the same glass substrate 211, resulting in lower manufacturing cost.

On the sealing film 257, there are formed a common counter electrode 224 used in common by the individual pixels and a protective film 225 composed of an acrylic resin 225a with minuscule particles 225b of silica dispersed therein.

A description will be given next to a method of manufacturing the foregoing liquid crystal display device.

Figure 15:
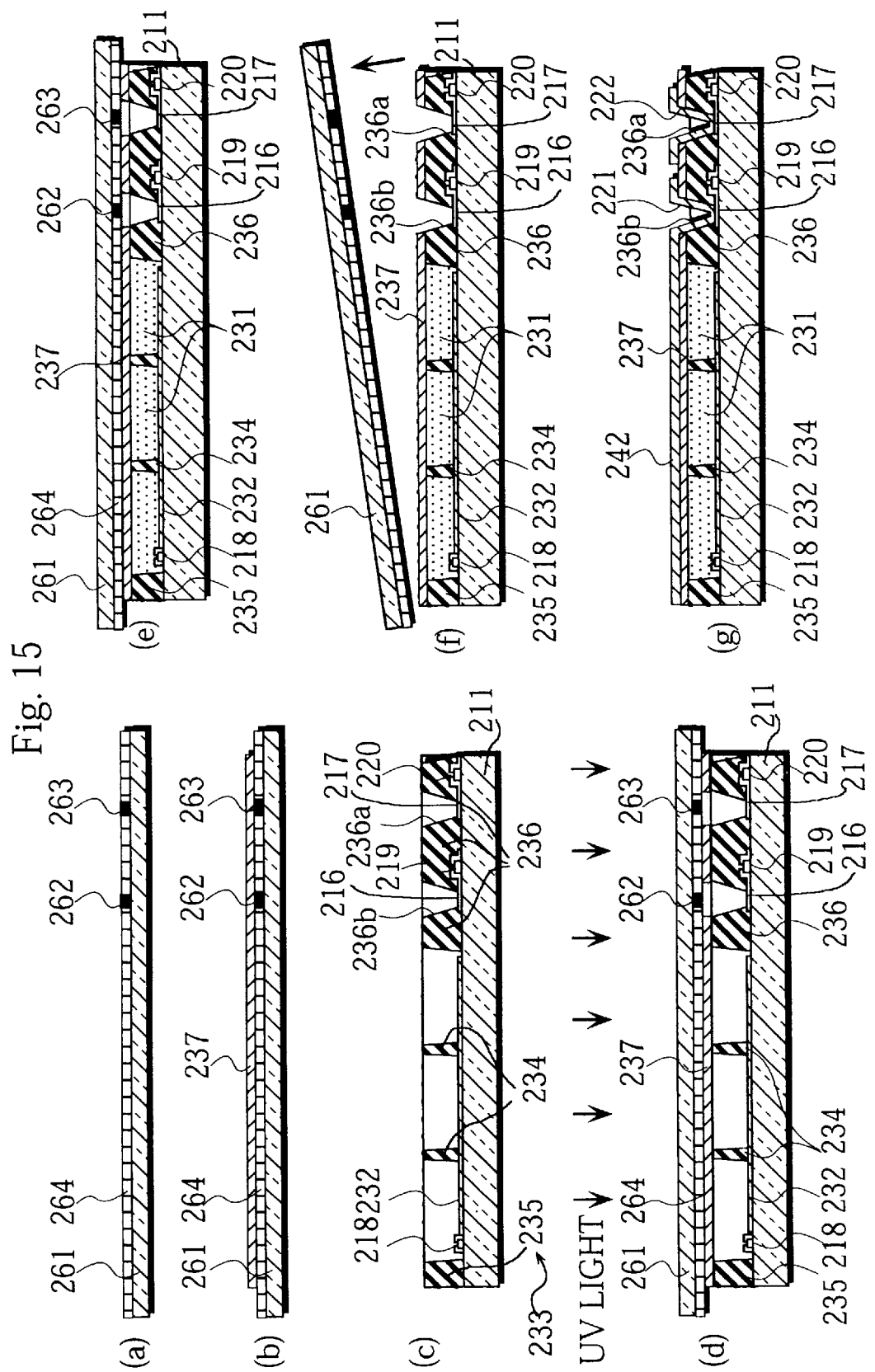
FIGS. 15(a)–15(g) illustrate a process of manufacturing the liquid crystal display device according to Example 2-3.

(1) As shown in FIG. 15(a), shielding films 262 and 263 made of chromium are formed on a plate member 261 made of PET (polyethylene terephthalate) and having a thickness of 0.3 mm to correspond to the openings 236a and 236b in the multi-level interconnect pad 236. Then, a fluorine resin commercially available as RF2000 from Sumitomo 3M Ltd., which is to serve as a mold release agent 264, is applied to a thickness of about 0.3 μm by using a spinner and then dried.

(2) As shown in FIG. 15(b), an acrylic negative resist commercially available as FVR from Fuji Chemical Industries, Ltd. is applied to a thickness of 1.0 μm by using a spinner and dried by evaporating the solvent at 80° C. to form the sealing film 237.

(3) Meanwhile, the support member 233 made of FVR, which is also used to compose the sealing film 237, and having a height of 3 μm is formed by photolithography on the glass substrate 211 formed previously with the TFTs 218 to 220, the pixel electrodes 232, and the like, as shown in FIG. 15(c).

(4) The sealing film 237 on the plate member 261 and the support member 233 on the glass substrate 211 are subjected to oxygen plasma processing for 1 minute in an $O_2$ asher, which promotes adhesion therebetween.

(5) As shown in FIG. 15(d), with the sealing film 237 tightly pressed against the support member 233, UV light is projected from a contact aligner onto the plate member 261 to cause polymerization for curing and joining the sealing film 237 and the support member 233, which are then heated at 150° C. for 1 hour in an oven for further curing. However, the portions of the sealing film 237 corresponding to the shielding films 262 and 263 on the plate member 261 are not polymerized because the UV light is shielded therefrom, so that they remain uncured.

(6) As shown in FIG. 15(e), the cyan guest-host liquid crystal 231 is introduced into the gap 231' between the glass substrate 211 and the sealing film 237 by vacuum injection and the openings 238 are sealed with the resin 239. The injection of the guest-host liquid crystal 231 may also be conducted after the transfer of the sealing film 237 or the formation of the pixel electrode 242, which will be described later, or simultaneously with the injection of the guest-host liquid crystals 241 and 251 after the transfer of the sealing films 247 and 257.

(7) As shown in FIG. 15(f), the sealing film 237 is transferred onto the substrate by slowly pealing the plate member 261 from the end thereof and immersed in a developing agent for a negative resist so that the openings 236b and 236a are formed in the portions of the sealing film 237 shielded from the UV light.

(8) As shown in FIG. 15(g), the ITO film is deposited on the sealing film 237 by sputtering with the substrate heated to a temperature of 100° C. The ITO film is then formed into the pixel electrode 242 and the link electrodes 221 and 222 by photolithography and etching.

In this manner, the liquid crystal layer 230 has been formed.

(9) The same steps as the foregoing (1) to (8) are repeated twice to form the liquid crystal layers 240 and 250.

In the photolithographic step (3), photo masks in different shielding patterns are used to form the support members 243 and 253 configured and arranged as described above.

(10) the acrylic resin 225a containing 1% of the minuscule particles of silica each having a diameter of 3 μm is applied to a thickness of 20 μm by screen printing to form the protective film 225, which prevents damage to the common counter electrode 224, degradation of the guest-host liquid crystal 251 due to moisture permeated by the common counter electrode 224 and sealing film 257, and the like, while increasing the light scattering property and thereby enlarging the viewing angle. Since the guest-host liquid crystal 251 is sealed by the sealing film 257, it is no more necessary to provide a counter substrate made of, e.g., glass as provided in the conventional embodiment, which facilitates the implementation of a light-weight, low-profile liquid crystal display device.

The liquid crystal display device thus fabricated provides display in the following manner.

A voltage V3 in accordance with a pixel signal to the liquid crystal layer 250 is generated based on a potential at the common counter electrode 224 and applied to the pixel electrode 252. A voltage V2 in accordance with a pixel signal to the liquid crystal layer 240 is generated based on a potential at the pixel electrode 252 and applied to the pixel electrode 242. A voltage V1 in accordance with a pixel signal to the liquid crystal layer 230 is generated based on a potential at the pixel electrode 242 and applied to the pixel electrode 232.

By thus applying the respective voltages of V3, V3+V2, and V3+V2+V1 to the pixel electrodes 252, 242, and 232 based on the potential at the common counter electrode 224, the voltages can be applied independently to the individual guest-host liquid crystals 231, 241, and 251.

In the case of performing AC driving to prevent the degradation of the guest-host liquid crystals 231, 241, and 251, voltages of (±V3), (±V3)+(±V2), and (±V3)+(±V2)+(±V1) where each of V1 to V3 is positive are applied properly.

To reduce the absolute values of the applied voltages and thereby suppress the output voltage from the driver circuit 227 or the like, voltages of opposite polarities are applied to each adjacent two of the liquid crystal layers 230, 240, and 250 so that voltages of (±V3), (±V3)−(±V2), and (±v3)−(±V2)+(±V1) are applied properly.

In the case where the pixel electrodes 242 and 252 are not used in common by the liquid crystal layers 230, 240, and 250 but a counter electrode and a pixel electrode are provided on each of the sealing films 237 and 247, it is sufficient to apply voltages of V1, V2, and V3 between the counter electrodes and the pixel electrodes.

Since color image display is performed by subtractive color mixing, when the image signal is represented by image data of RGB (Red, Green, and Blue), it is converted to image data of CMY (Cyan, Magenta, and Yellow) by complementation so that a voltage corresponding to the complement is applied properly. Specifically, when given RGB data is (1, 0, 0) in the case of eight color display, a voltage corresponding to the complements (0, 1, 1) is applied properly.

By thus applying voltages of 0 to 5 volts as V1 to V3, full-color display of an image was achieved with high contrast of 12 and with reflectance of 43%. The image displayed exhibited equally high brightness and contrast and was free from color displacement resulting from parallax.

Although the thickness of each of the guest-host liquid crystal 231, 241, and 251 and the thickness of each of the sealing films 237, 247, and 257 are adjusted to be 3 µm and 1 µm In Example 2-3, respectively, they are not limited to the values but may be varied as follows.

If the sealing films 237, 247, and 257 are excessively thin, they are deformed in forming the pixel electrode 242 of ITO or the like to easily develop a wrinkle or a crack so that, when the sealing films 237, 247, and 257 are made of the foregoing materials, they are preferably formed to have a thickness of 0.5 µm or more. In the case of using another material, however, a thickness less than 0.5 µm may be used depending on the physical properties of the material.

As for the maximum thicknesses of the sealing films 237, 247, and 257, they are preferably determined as follows based on the aperture ratio associated with the size of the multi-level interconnect pad 246 and on the drive voltage to be applied.

Preferably, the openings 236a and 236b in the sealing film 237 and in the multi-level interconnect pad 236 of the liquid crystal layer 230 have tapered profiles as well as an average diameter measured at a vertical midpoint thereof which is approximately the sum of the height of the multi-level interconnect pad 236 and the thickness of the sealing film 237, so that the link electrodes 221 and 222 are positively formed on the inner surfaces thereof. On the other hand, the opening 246a in the sealing film 247 and in the multi-level interconnect pad 246 of the liquid crystal layer 240 preferably has a diameter approximately double the average diameter of the opening 236a or 236b. However, as the diameter of the opening 246a is larger, the multi-level interconnect pad 236 is increased in size and the effective aperture ratio is reduced, so that the diameter of the opening 236a is preferably about 30 to 50 µm when the pixel pitch on the display is about 100 to 300 µm. Therefore, the sum of the height of the multi-level interconnect pad 236 (i.e., the thickness of the guest-host liquid crystal 231, 241, or 251) and the thickness of the sealing film 237 is preferably adjusted to be about 20 µm or less.

Since the drive voltage is applied to the pixel electrode 232 through the guest-host liquid crystal 231 and the sealing film 237 interposed therebetween, if the sealing film 237 is thicker than the guest-host liquid crystal 231, a voltage actually placed on the guest-host liquid crystal 231 unfavorably becomes ½ or less of the applied drive voltage. Accordingly, the thickness of the sealing film 237 is preferably adjusted to be equal to or less than the thickness of the guest-host liquid crystal 231.

Hence, the thickness of the sealing film 237, 247, or 257 is preferably adjusted to be about 10 µm or less. When the thickness of the guest-host liquid crystal 231, 241, or 251 is adjusted to be 3 µm, as in Example 2-3, the thickness of the sealing film 237, 247, or 257 is preferably adjusted to be about 3 µm or less.

Although Example 2-3 has shown the embodiment using the negative resist to compose the sealing film 237, 247, or 257, a positive resist may also be used as the sealing film 237, 247, or 257. If it is transparent, an inorganic dielectric film or the like may be formed on the plate member 261 by vapor deposition, transferred to the glass substrate 211, and bonded to the support member 233, 243, or 253 with an adhesive. In this case, the opening 236b, 236a, or 246a is properly formed by photolithography, etching, or like technique prior to or after the bonding to the support member 233, 243, or 253.

Although Example 2-3 has shown the embodiment using the fluorine resin as the mold releasing agent 264 to allow easy peeling of the sealing film 237 from the plate member 261, it is also possible to perform a surface treatment with respect to the plate member 261 with a single-molecular film such as a silane coupler. Alternatively, a film easily soluble in water or the like, such as PVA (polyvinyl alcohol) may be applied previously and immersed in water or the like in peeling the sealing film 237 so that PVA is dissolved.

Instead of peeling the sealing film 237 from the plate member 261, it is also possible to remove the plate member 261 by dissolving it in a solution. Specifically, by using Pullulan commercially available from Rayashibara Co., Ltd. to compose the plate member 261, the sealing film 237 is bonded to the support member 233 (see FIG. 15(d)) and then and the guest-host liquid crystal 231 is injected (see FIG. 15(e)). The whole panel is then immersed in pure water, with the result that the plate member 261 is dissolved in several minutes and only the sealing film 237 is left to be transferred to the glass substrate 211. In this case, the mold releasing step and the peeling step are no more necessary and uniform transfer can be performed easily even though the adhesion between the sealing film 237 and the support member 233 is poor.

Although Example 2-3 has shown the embodiment in which the opening 236b, 236a, or 246a is formed in the sealing film 237 or 247 by blocking the UV light with the shielding films 262 and 263 to inhibit polymerization and developing the sealing film 237 or 247, it is also possible to apply the mold releasing agent 264 to the plate member 261 except for the portion corresponding to the opening 236b, 236a, or 246a such that the portion of the sealing film 237 or 247 is not transferred to the glass substrate 211.

More specifically, in the case of using the mold releasing agent 264, the mold releasing agent 264 is applied to the entire plate member 261 and then partially removed by photolithography of the like from the portion of the plate member 261 corresponding to the opening 236b, 236a, or 246a or, in the case of performing the surface treatment with respect to the plate member 261 with the single-molecular film, a resist is preliminarily formed on the portion of the plate member 261 corresponding to the opening 236b, 236a, or 246a and removed after the surface treatment with the single-molecular film before the sealing film 237 is applied, so that the portion of the sealing film 237 corresponding to the opening 236b, 236a, or 246a is not transferred but remains attached to the plate member 261. Thus, the opening 236b, 236a, or 246a can be formed without performing the foregoing developing step.

Although Example 2-3 has shown the embodiment in which the sealing film 237 composed of the negative resist is bonded to the support member 233 by inducing polymerization with the sealing film 237 tightly pressed against the support member 233, the bonding may also be performed by applying an adhesive resin composed of another material or the like. In particular, excellent adhesion is achieved effectively when a UV curing adhesive is diluted with a solvent, applied to a small thickness of about 0.1 to 0.3 μm by spin coating, and exposed to UV light. Even when the same material is polymerized for adhesion as in Example 2-3, an adhesive layer having a different molecular weight and a different composition is formed between the sealing film and the support member, similarly to the case where the adhesive is used.

Instead of injecting the guest-host liquid crystals 231, 241, or 251 after the bonding of the sealing film 237, 247, or 257, the guest-host liquid crystals 231, 241, or 251 may also be injected simultaneously with the bonding of the sealing film 237, 247, or 257.

Figure 16:
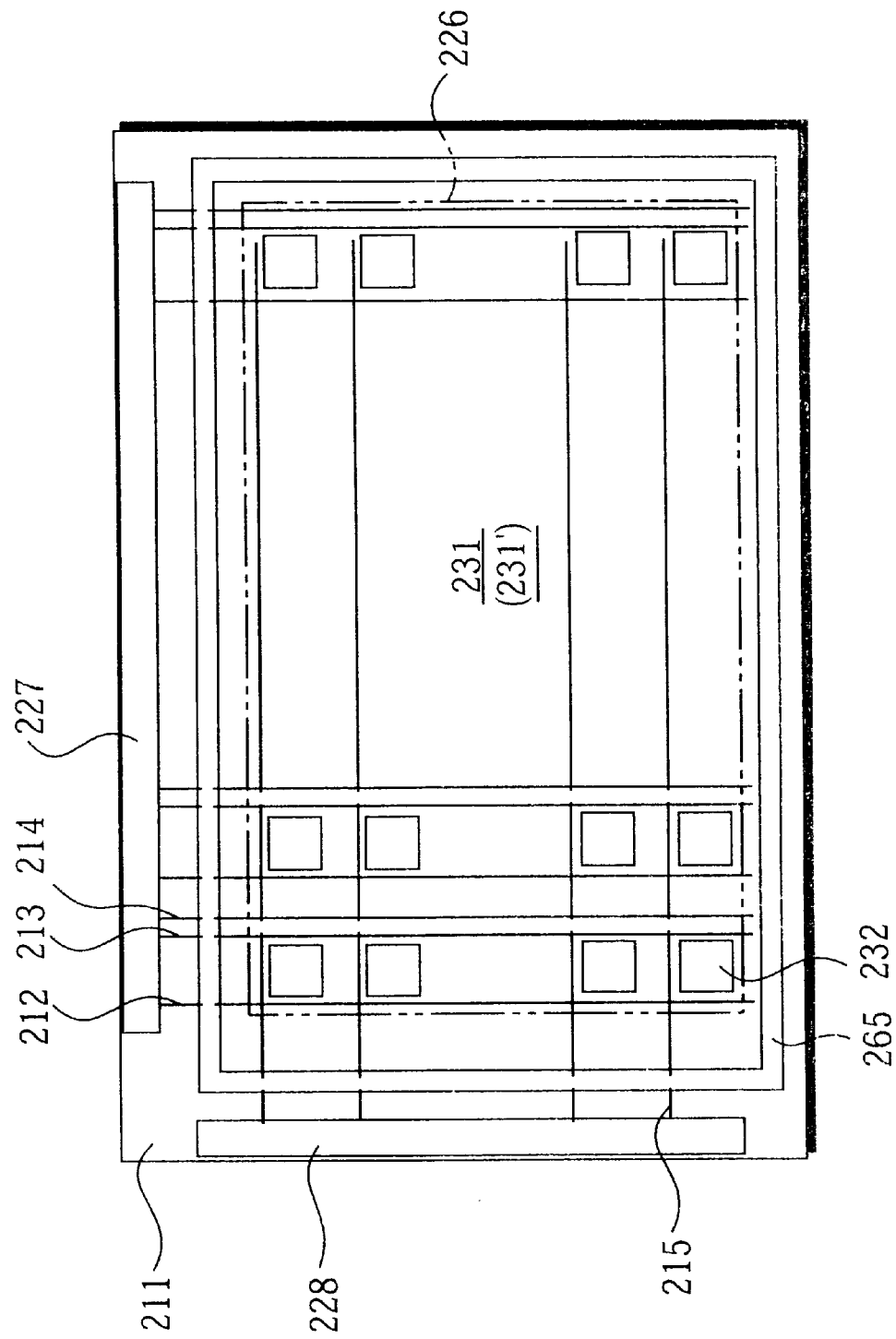
FIG. 16 is a plan view of another embodiment of the liquid crystal display device according to Example 2-3.

Specifically, as shown in FIG. 16, only the dotted spacers 234, 244, or 254 and the multi-level interconnect pads 236, 246, or 256 are provided as the support member 233, 243, or 253 to ease the movement of the guest-host liquid crystal 231 and the UV curing sealing resin 265 is applied to the peripheral portion of the image display area 226 by printing or like technique. Then, the guest-host liquid crystals 231, 241, or 251 in an amount corresponding to the capacity of the gap 231', 241' or 251' is accurately measured and applied dropwise by means of a dispenser. After that, the plate member 261 formed with the sealing film 237, 247, or 257 is laminated under vacuum, while being pressed to crush the sealing resin 265. After atmospheric pressure is recovered, the sealing resin 265 is cured by exposure to UV light for the bonding of the sealing film 237, followed by the peeling off of the plate member 261.

In this case, the injected guest-host liquid crystals 231, 241, or 251 is placed under slightly reduced pressure and the dotted spacers 234, 244, or 254 and the sealing film 237, 247, or 257 are in substantially intimate contact, so that the sealing film 237, 247, or 257 is peeled from the plate member 261 relatively easily and transferred without being impaired even when the sealing film 237, 247, or 257 are not bonded to the linear spacers 235, 245, or 255 by exposure to UV light. In the case of mold releasing with PVA solved in water, as described above, transfer is performed more easily.

Although the support member 233, 243, or 253 is formed on the glass substrate 211 in the foregoing embodiments, they may also be formed on the plate member 261 in conjunction with the sealing film 237, 247, or 257 and transferred to the glass substrate 211.

In place of the sealing film 257, the common counter electrode 224, and the protective film 225, it is also possible to provide the glass substrate 271 formed with the common counter electrode 224, similarly to Example 2-4 which will be described below.

EXAMPLE 2-4

A description will be given first to the structure of a liquid crystal display device manufactured in accordance with a manufacturing method according to Example 2-4 of the present invention.

Figure 17:
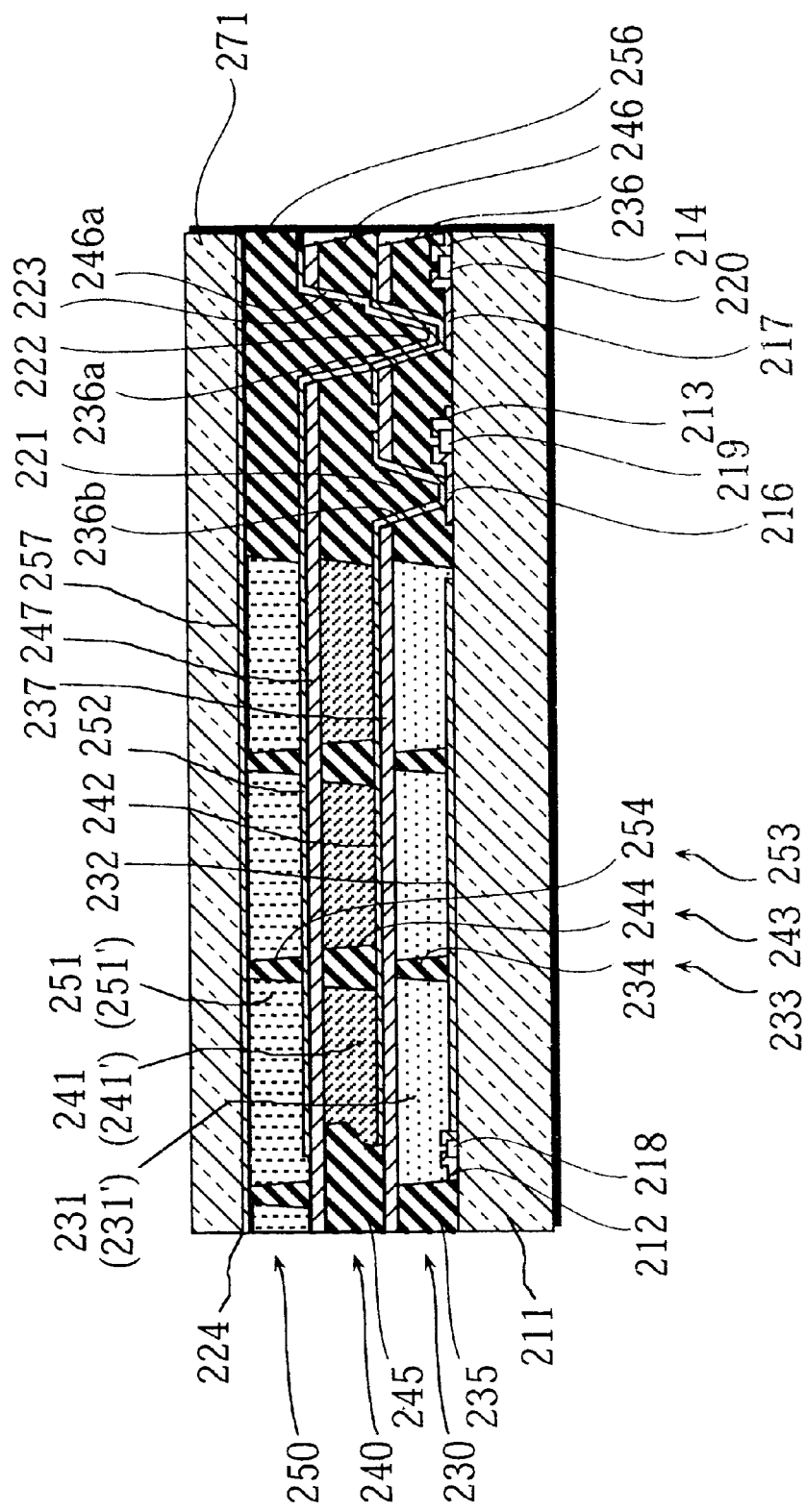
FIG. 17 is a cross-sectional view showing the structure of one pixel of a liquid crystal display device according to Example 2-4 of the present invention in the second mode.

FIG. 17 is a cross-sectional view showing the structure of one pixel in the liquid crystal display device.

Figure 18:
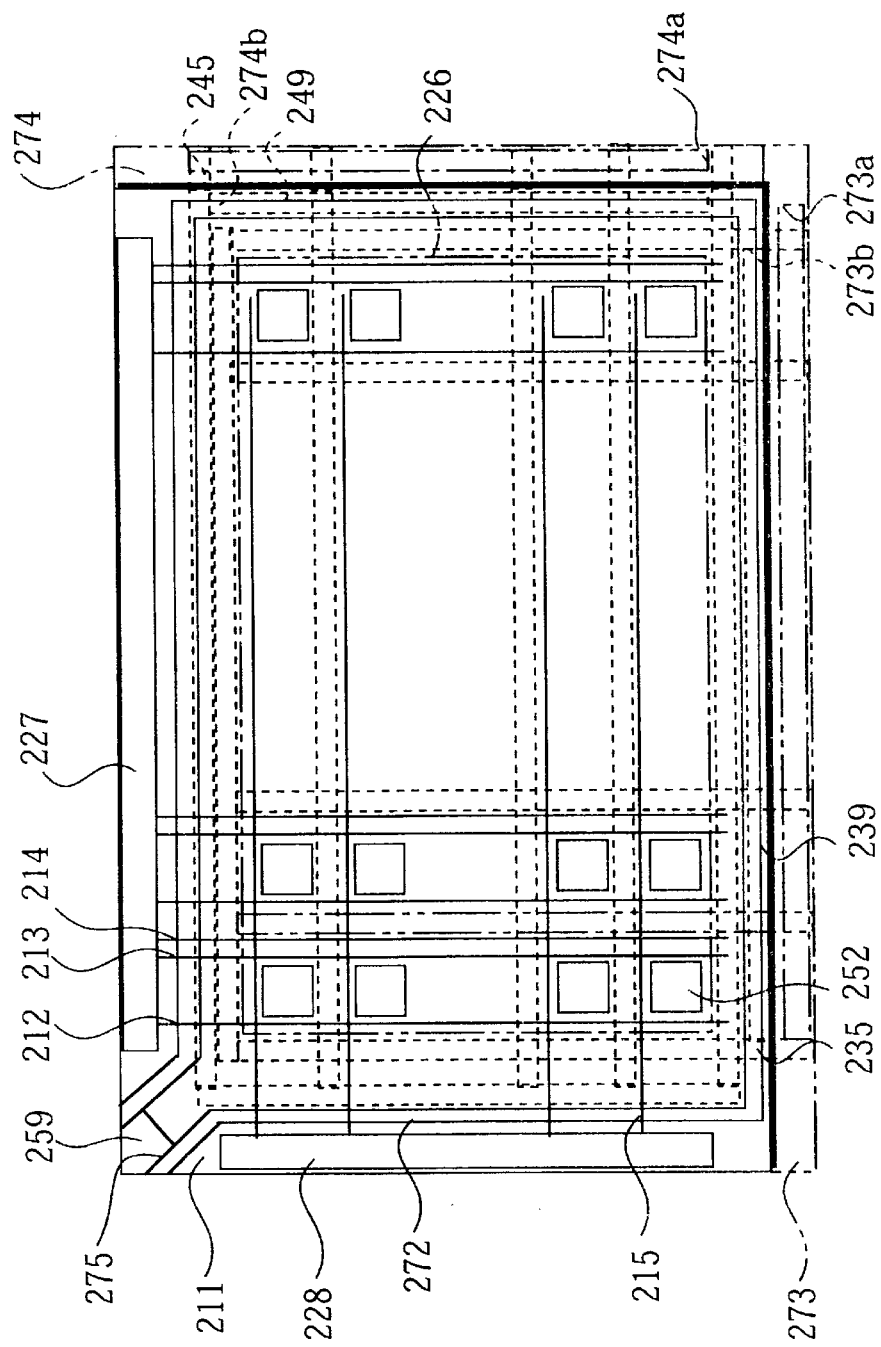
FIG. 18 is a plan view showing the overall structure of the liquid crystal display device according to Example 2-4.

FIG. 18 is a plan view showing the overall structure of the liquid crystal display device.

As for the components having the same functions as in the liquid crystal display device of Example 2-3, the detailed description thereof will be omitted by providing the same reference numerals.

As shown in FIG. 17, the liquid crystal display device is provided with a glass substrate 271 formed with the common counter electrode 224, instead of the sealing film 257, common counter electrode 224, and protective film 225 used in Example 2-3. The support member 253 is composed only of the dotted spacers 254 and the multi-level interconnect pad 256. As shown in FIG. 18, the sealing film 247 for the liquid crystal layer 240 and the glass substrate 271 are joined together at the peripheral portion of the image display area 226 with the sealing resin 272, so that the guest-host liquid crystal 251 is injected into the space formed therebetween.

In the process of manufacturing the liquid crystal display device, solid-film removing portions 273 and 274 formed with exhaust holes 273 and 274 (see FIG. 18) are provided, as will be described later.

Next, the method of manufacturing the liquid crystal display device will be described.

The method of manufacturing the liquid crystal display device according to Example 2-4 is the same as the manufacturing method proposed by the present inventors in Japanese Patent Publication HEI 8-146456 in that, after the formation of solid film 233' and sealing film 237 on a glass substrate 211, the solid film 233' is removed to form a gap 231' and a guest-host liquid crystal 231 is filled in the gap. However, the method according to Example 2-4 is different from the prior art method in that the solid film 233' is removed not by development but by evaporation.

Figure 19:
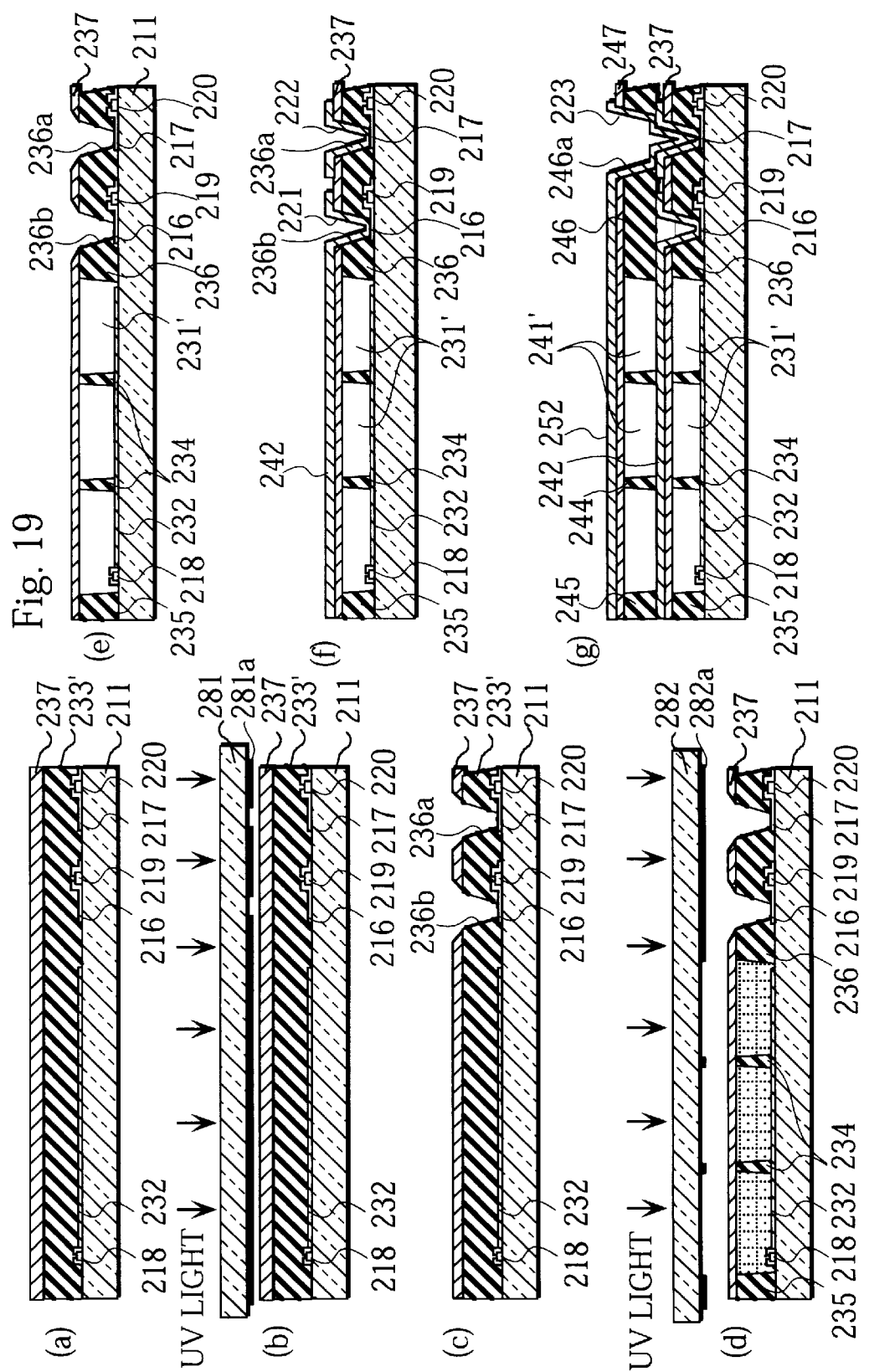
FIGS. 19(a)–19(g) illustrate a process of manufacturing the liquid crystal display device according to Example 2-4.
Figure 20:
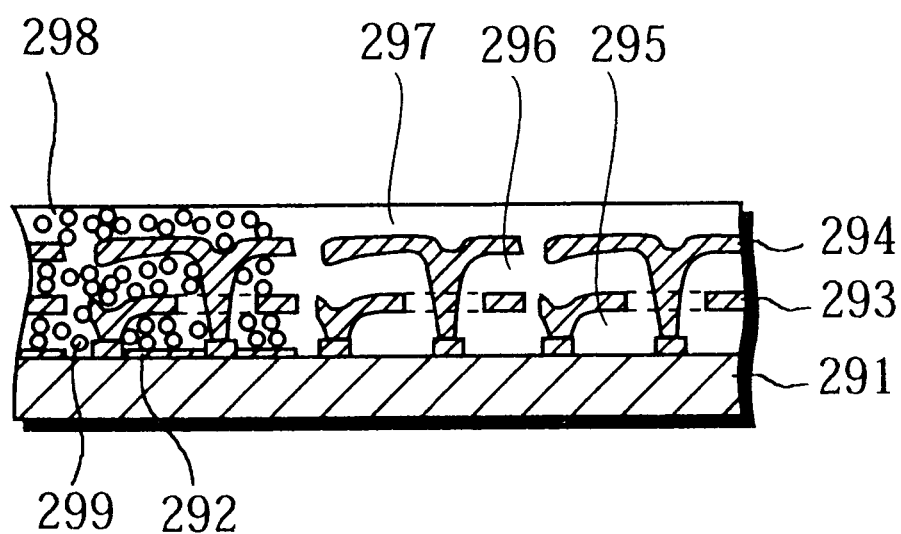
FIG. 20 is a cross-sectional view showing the structure of a conventional liquid crystal display device.

(1) First, as shown in FIG. 19(a), a positive resist prepared by adding 1 wt % of triphenylsulfonium hexafluoroantimony ($Ph_3S^{--}SbF_6$) as an onium salt to polyphthalaldehyde (PPA) and dissolving the resulting mixture in cyclohexane is applied onto the glass substrate preliminarily formed with the TFTs 218 to 220 and pixel electrode 232 and dried by evaporating the solvent at 80° C., thereby forming the solid film 233' with a thickness of 3 μm.

Onto the solid film 233', an acrylic positive resist such as JSR-126 commercially available from Japan Synthetic Rubber Co., Ltd. is applied to a thickness of 1.0 μm and dried at 85° C. to form the sealing film 237. Although the thickness of the sealing film 237 is not limited to the foregoing, it is preferably adjusted to be 10 μm or less for the reason as described in Example 2-3. More preferably, the thickness of the sealing film 237 is adjusted to be 0.5 to 3 μm.

Polyphthalaldehyde composing the solid film 233' is obtained by polymerizing o-phthalaldehyde, as disclosed in a report (Hiroshi Ito and Reinhold Schwalm, J. Electrochem. Soc., Vol. 136, No. 1, pp. 231–245, 1989), and has the structure represented by the following Chemical Formula 1. Polyphtalaldehyde has the property of being depolymerized to form phthalaldehyde, which is a monomer, when it is exposed to UV light with a wavelength of 254 nm and an intensity of 5 $mJ/cm^2$ and heated to 100° C.

Chemical Formula 1

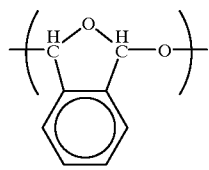

The acrylic positive resist composing the sealing film 237 has the property of being dissolved in a developing agent when it is exposed to an i-line UV light with an intensity of 100 mJ/Cm².

(2) As shown in FIG. 19(b), the resulting structure is exposed to an i-line UV light with an intensity of 100 mJ/cm² from a super high pressure mercury discharge lamp through a photo mask 281 formed with a shielding film 281a except for portions corresponding to the opening 236a and 236b of the sealing film 237 and multi-level interconnect pad 236 and to the exhaust hole 273a of the solid film removing portion 273.

(3) The portions of the solid film 233' and sealing film 237 exposed to the UV light are dissolved in the developing agent, resulting in the openings 236a and 236b shown in FIG. 19(c) and in the exhaust hole 273a with a width of 100 μm (see FIG. 18). It is also possible to form a plurality of exhaust holes 273a on the periphery of the image display area 226 to promote the removal of the solid film 233', which will be described later.

(4) As shown in FIG. 19(d), the solid film 233' except for the portion forming the support member 233, i.e., the portion of the solid film 233' forming the gap 231' for containing the guest-host liquid crystal 231 is exposed to UV light with a wavelength of 254 nm and an intensity of 5 mJ/cm² through a photo mask 282 formed with a shielding film 282a corresponding to the support member 233 (including the dotted spacers 234, the linear spacer 235, and the multi-level interconnect pad 236). As a result, the portion of the solid film 233' exposed to the UV light is depolymerized to form a liquid monomer. However, since the sealing film 237 is stable under the radiation of the UV light having the low intensity, it exhibits no particular change, which allows easy, selective depolymerization of only the solid film 233'.

(5) When the resulting structure is heated to 80° C. and evacuated to 0.4 atmospheric pressure in a vacuum drier, the portion changed into the monomer is evaporated and exhausted through the exhaust hole 273a of the solid film removing portion 273 in less than 1 minute. As a result, the portion of the solid film 233' corresponding to the evaporated monomer forms the gap 231' for containing the guest-host liquid crystal 231, while the remaining portion of the solid film 233' forms the support member 233 for supporting the sealing film 237.

In general, if the solid film 233' changed into the monomer is placed in such an open space in which normal photolithography is performed, the portion thereof changed into the monomer is evaporated at a relatively high speed depending on the concentration of the onium salt at a temperature ranging from room temperature to 100° C. under normal pressure. However, since the solid film 233' is covered with the sealing film 237 as described above, the evaporation process requires, e.g., about 1 hour if it is performed under normal pressure. The evacuation process is therefore performed as described above, thereby completing the evaporation in less than 1 minute.

(6) The supporting member 233 and the sealing film 237 are subjected to a thermal treatment at 180° C. for 1 hour so that further polymerization proceeds therein.

(7) As shown in FIG. 19(f), an ITO film is deposited on the sealing film 237 by sputtering with the substrate heated at 100° C. The ITO film is then formed into the pixel electrode 242 and the link electrodes 221 and 222 by photolithography and etching. The formation of the pixel electrode 242 and the like may also be performed prior to the removal of the solid film 233' or the like provided that it is performed after the formation of the openings 236a and 236b.

(8) By repeating the same steps as the foregoing (1) to (7), the liquid crystal layer 240 having the gap 241' is formed as shown in FIG. 19(g).

In the exposure steps (2) and (4), photo masks in different shielding patterns are used to form the supporting member 243 and the sealing film 247, as described above, while the opening 274a (see FIG. 18) is formed in the sealing film 247.

(9) By repeating the same steps as the foregoing (1) to (6), only the dotted spacers 254 and the multi-layer interconnect pad 256 compose the support member 253 in the liquid crystal layer 250.

(10) The sealing resin 272 is applied to the peripheral portion of the image display area 226 by printing or like technique, to which the glass substrate 271 formed with the common counter electrode 224 is bonded, resulting in the liquid crystal layer 250 formed with the space 251' having an opening 275.

(11) The solid film removing portion 273 is cut away by a scribing process and the guest-host liquid crystal 231 of cyan is introduced into the gap 231' in cross section from the opening 273b thereof by vacuum injection. After that, the opening 273b is sealed with the resin 239.

(12) likewise, the solid film removing unit 274 is cut away by a scribing process and the guest-host liquid crystal 241 of magenta is introduced into the gap 241' in cross section from the opening 274b thereof by vacuum injection. After that, the opening 274b is sealed with the resin 249.

(13) The yellow gust-host liquid crystal 251 is introduced from the opening 275 by vacuum injection and then the opening 275 is sealed with a resin 259.

The same voltage as used in Example 2-3 was applied to the liquid crystal display device thus fabricated to achieve full-color display of an image with high contrast of 12 and with reflectance of 40%. The image displayed had uniformly high brightness and contrast and was free from color displacement resulting from parallax.

Although flicker was observed due to a slight reduction in data retentivity in the case of using the onium salt in the positive resist made of polyphthalaldehyde (PPA) as described above, it presented practically no problem.

Although Example 2-4 has composed the solid film 233' of PPA with the onium salt added thereto, which is a kind of chemically amplified resist, a material used to compose the solid film 233' is not limited thereto.

Although PPA is among materials suitable for use in the present invention since it is highly sensitive, can be decomposed from polymer to monomer on exposure to UV light, can easily be evaporated at ordinary temperature under normal pressure, and can easily be formed Into a minuscule pattern, the material composing the solid film 233' is not limited thereto. A variety of other materials can be used provided that they are highly evaporable solid materials which are readily decomposed or sublimed under such treatments as heating, evacuation, and exposure to an energy beam of UV light, an electron beam, or an X-ray with or without heating and which can easily be coated with the sealing film 237.

Specifically, not only PPA but also Cl- or Br-substituted PPA can be used because of its property of being decomposed on exposure to UV light and evaporated under heating at 100° C., as described in the aforesaid report (Hiroshi Ito and Reinhold Schwalm, J. Electrochem. Soc. Vol. 136, No. 1, pp. 241–245, 1989). In addition, polycarbonate and polymethacrylic acid can also be used because of their similar properties.

The support members 233, 243, and 253 are not necessarily formed of the resist cured as described above. It may be formed preliminarily of a stable material. In this case, not only a material which becomes evaporable on exposure to UV light but also a sublimable material such as camphor can be used.

The sealing films 237, 247, and 257 are not necessarily formed of a material which involves the formation of the openings 236a, 236b, and 246a by development after exposure to UV light but can be formed of another material that allows the formation of the openings 236a, 236b, and 246a by, e.g., photolithography or etching. However, the material should not be liquidified or evaporated under such treatments as exposure to UV light and heating for evaporating the solid films 233'.

In place of the glass substrate 271 formed with the common counter electrode 224, there may also be used the sealing film 257, the common counter electrode 224, and the protective film 225, similarly to Example 2-3.

Although Examples 2-1 to 2-4 have shown the embodiments in which the three liquid crystal layers 230, 240, and 250 are laminated, similar effects can also be obtained with two liquid crystal layers or with four or more liquid crystal layers. Even a single liquid crystal layer achieves such effects as a lower-profile device or a simplified manufacturing process.

Although Examples 2-1 to 2-4 have described the active-matrix liquid crystal display devices provided with TFTs 218 to 220, the present invention is also applicable to a passive-matrix liquid crystal display device.

The liquid crystal material is not limited to the foregoing guest-host liquid crystal but various other liquid crystal materials can be used instead.

The present invention is also applicable to a transmission-type (backlight-type) liquid crystal display device, though the application of the present invention to a reflection-type liquid crystal display device is significant because high light transmittance is required therein.

What is claimed is:

1. A liquid crystal display device comprising:
   a liquid crystal layer composed of a liquid crystal sealed between a substrate and a sealing plate;
   a support member interposed between the substrate and the sealing plate to support the sealing plate; and
   an electrode formed on a surface of the sealing plate other than a sealing surface thereof,
   said support member and said sealing plate being made of a polymer having the same composition and formed integrally with each other to hold the liquid crystal layer,
   said electrode, said support member, said sealing plate, and said liquid crystal layer composing a display layer.

2. A liquid crystal display device according to claim 1, wherein the sealing plate has a thickness of 0.5 to 10 µm.

3. A liquid crystal display device according to claim 1, wherein a plurality of display layers are provided and the liquid crystal layers in the respective display layers contain dichroic dyes of different colors.

4. A liquid crystal display device according to claim 1, wherein the liquid crystal layer is composed of three layers and at least the two layers thereof closer to the substrate are held by the display layer having said structure.

5. A liquid crystal display device according to claim 4, wherein the three liquid crystal layers contain dichroic dyes of different colors which are cyan, magenta, and yellow.

6. A liquid crystal display device according to claim 5, wherein a reflecting film is formed on a surface of the substrate or on the outermost one of the three liquid crystal layers.

7. A liquid crystal display device according to claim 5, wherein the support member in each of the display layers has the same color as the dichroic dye contained in the corresponding liquid crystal layer.

8. A liquid crystal display device according to claim 7, wherein the support member is made of a photosensitive polymer resin having a pigment dispersed therein.

9. A liquid crystal display device according to claim 6, wherein respective ratios of actual absorbances to theoretical absorbances of the dichroic dyes in the three liquid crystal layers are determined to be in decreasing order of magnitude toward the outermost liquid crystal layer.

* * * * *